(12) United States Patent
Li et al.

(10) Patent No.: US 10,802,479 B2
(45) Date of Patent: Oct. 13, 2020

(54) TECHNIQUES FOR IMAGE RECOGNITION-BASED AERIAL VEHICLE NAVIGATION

(71) Applicant: SZ DJI TECHNOLOGY CO., LTD., Shenzhen (CN)

(72) Inventors: Peiliang Li, Shenzhen (CN); Jie Qian, Shenzhen (CN); Cong Zhao, Shenzhen (CN); Xuyang Feng, Shenzhen (CN); You Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/199,032

(22) Filed: Nov. 23, 2018

(65) Prior Publication Data
US 2019/0094850 A1 Mar. 28, 2019

Related U.S. Application Data

(63) Continuation of application No. PCT/CN2016/083363, filed on May 25, 2016.

(51) Int. Cl.
*G06F 3/0482* (2013.01)
*G05D 1/00* (2006.01)
(Continued)

(52) U.S. Cl.
CPC ......... *G05D 1/0016* (2013.01); *B64C 39/024* (2013.01); *G05D 1/0033* (2013.01);
(Continued)

(58) Field of Classification Search
CPC .. G05D 1/0016; G05D 1/0033; G05D 1/0094; G05D 1/101; G05D 1/0038;
(Continued)

(56) References Cited

U.S. PATENT DOCUMENTS

2015/0230150 A1* 8/2015 Wang ................. H04B 7/18506
370/252
2015/0268666 A1* 9/2015 Wang ................... G05D 1/0016
701/2
(Continued)

FOREIGN PATENT DOCUMENTS

CN 102043410 A 5/2011
CN 102266672 A 12/2011
(Continued)

OTHER PUBLICATIONS

The World Intellectual Property Organization (WIPO) International Search Report and Written Opinion for PCT/CN2016/083363 dated Mar. 8, 2017 8 pages.

*Primary Examiner* — Masud Ahmed
(74) *Attorney, Agent, or Firm* — Anova Law Group, PLLC

(57) ABSTRACT

A system for controlling an unmanned aerial vehicle (UAV) includes a processor and a storage medium storing instructions that, when executed by the processor, cause the processor to receive image data from a camera coupled to the UAV that is associated with a first view of the camera, send the image data in real time to a client device, and receive control data from the client device. The control data is associated one or more reference coordinates corresponding to a gesture-based input indicating a change from the first view to a second view of the camera. The gesture-based input is associated with at least one region of the image data. The instructions further cause the processor to control the UAV to change at least one of a position or an attitude of the UAV based on the control data.

24 Claims, 13 Drawing Sheets

(51) Int. Cl.
G08C 17/00 (2006.01)
B64C 39/02 (2006.01)
G05D 1/10 (2006.01)
B64D 13/06 (2006.01)

(52) U.S. Cl.
CPC ......... G05D 1/0038 (2013.01); G05D 1/0094 (2013.01); G05D 1/101 (2013.01); G08C 17/00 (2013.01); *B64C 2201/027* (2013.01); *B64C 2201/123* (2013.01); *B64C 2201/127* (2013.01); *B64C 2201/14* (2013.01); *B64C 2201/146* (2013.01); *B64D 2013/0603* (2013.01); *G08C 2201/32* (2013.01)

(58) Field of Classification Search
CPC .............. B64C 39/024; B64C 2201/14; B64C 2201/127; B64C 2201/123; B64C 2201/027; B64C 2201/146; G08C 17/00; G08C 2201/32; B64D 2013/0603
USPC .......................................................... 701/2
See application file for complete search history.

(56) References Cited

U.S. PATENT DOCUMENTS

| | | | | |
|---|---|---|---|---|
| 2015/0321758 | A1* | 11/2015 | Sarna, II | G05D 1/0011 244/63 |
| 2015/0370250 | A1* | 12/2015 | Bachrach | G05D 1/0016 701/2 |
| 2016/0327950 | A1* | 11/2016 | Bachrach | G05D 1/0016 |
| 2016/0349849 | A1* | 12/2016 | Kwon | G06F 3/011 |
| 2017/0201714 | A1* | 7/2017 | Kim | H04N 5/911 |
| 2018/0194455 | A1* | 7/2018 | Park | G05D 1/0038 |
| 2018/0332213 | A1* | 11/2018 | Kucharski | H04N 5/23206 |

FOREIGN PATENT DOCUMENTS

| | | |
|---|---|---|
| CN | 103955228 A | 7/2014 |
| CN | 105283816 A | 1/2016 |
| CN | 105425952 A | 3/2016 |
| CN | 105867362 A | 8/2016 |

\* cited by examiner

TECHNIQUES FOR IMAGE RECOGNITION-BASED AERIAL VEHICLE NAVIGATION

CROSS-REFERENCE TO RELATED APPLICATION

This application is a continuation of International Application No. PCT/CN2016/083363, filed on May 25, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The disclosed embodiments relate generally to techniques for controlling mobile object navigation and more particularly, but not exclusively, to gesture-based control.

BACKGROUND

Aerial vehicles such as unmanned aerial vehicles (UAVs) can be used for performing surveillance, reconnaissance, and exploration tasks for various applications. For example, UAVs are increasingly used by aerial photography enthusiasts with imaging devices to capture images that previously could not be captured, or could only be captured at great expense. However, to capture the intended image, the UAV and the imaging device must be moved into position to compose the shot. This typically requires both a pilot, to maneuver the UAV, and a camera operator, to orient the imaging device mounted to the UAV. The pilot and camera operator must coordinate movements to properly compose the shot for the photograph, often resulting in multiple trials before a satisfactory angle is obtained. As such, it can be a costly and time consuming process to setup such shots.

Further, UAVs are typically controlled using remote controls, either physical remote controls or virtual remote controls that are provided as part of an application. Both physical and virtual remote controls operate by directly controlling the UAV's attitude and speed. Such controls provide pilots with a relatively simple and intuitive way to maneuver a UAV to a particular location. However, when used for aerial photography, the UAV may include an image capture device that is controlled independently of the UAV. As such, to compose an aerial photograph, the pilot must reposition the UAV, to indirectly change the orientation of the image capture device and adjust the composition of the aerial photograph. Such indirect control methods can require significant effort to adequately compose the photograph. Additionally, such control methods can make it difficult to capture a self-portrait, when the image capture device is directed at the user. This requires the user to adjust the position of the UAV in the opposite direction, making composition of such photographs even more difficult. Embodiments of the present disclosure address these and other issues.

SUMMARY

Described herein are techniques for controlling mobile object navigation. A client device can receive image data associated with a first view from the image capture device. The client device can detect a gesture-based input indicating a change from the first view to a second view from the image capture device. The gesture-based input is associated with at least one first region of the image data. Control data associated with the change from the first view to the second view may be determined based on one or more reference coordinates associated with the gesture-based input.

Systems and methods are described herein for controlling a movable object with an image capture device. A client device can receive image data associated with a first view from the image capture device. The client device can detect a gesture-based input indicating a change from the first view to a second view from the image capture device. The gesture-based input can be associated with at least one first region of the image data. The client device can determine control data associated with the change from the first view to the second view. The control data can be determined based on one or more reference coordinates associated with the gesture-based input.

In accordance with an embodiment, a system for controlling a movable object with an image capture device can include a communication module associated with at least one of the movable object or the image capture device, one or more microprocessors, and a memory. The system may further include one or more programs, wherein the one or more programs are stored in the memory and configured to be executed by the one or more microprocessors. The one or more programs including instructions to perform the steps comprising: receiving image data associated with a first view from the communication module, displaying the image data captured by the image capture device in real time, detecting a gesture-based input indicating a change from the first view to a second view, wherein the gesture-based input is associated with at least one first region of the image data, determining control data associated with the change from the first view to the second view, wherein the control data is associated with at least one first region of the image data and one or more reference coordinates associated with the gesture-based input; and sending the control data to the communication module.

Systems and methods are further described for controlling an unmanned aerial vehicle (UAV). An unmanned aerial vehicle (UAV), including one or more microprocessors, can be configured to move in response to control data. A camera can be coupled to the UAV, the camera operating to capture image data. A controller running on the one or more microprocessors, can operate to send the image data in real time to a client device, the image data associated with a first view of the camera; receive control data from the client device, wherein the control data is associated one or more reference coordinates corresponding to a gesture-based input indicating a change from the first view to a second view of the camera, wherein the gesture-based input is associated with at least one first region of the image data; and cause a change in at least one of a position or an attitude of the UAV based on the control data.

Also described herein are systems and methods for controlling a movable object with an image capture device. A movable object can include an image capture device configured to capture image data associated with a first view of the image capture device on the movable object. The movable object can receive control data which is associated with one or more reference coordinates corresponding to a gesture-based input indicating a change from the first view to a second view of the image capture device on the movable object. The gesture-based input can be associated with at least one first region of the image data. At least one of the movable object or the image capture device can be caused to move based on the control data.

DETAILED DESCRIPTION

The disclosure is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the disclosure describes the control and navigation of a movable object. For simplicity of explanation, an unmanned aerial vehicle (UAV) is generally used as example of a movable object. It will be apparent to those skilled in the art that other types of movable objects can be used without limitation.

In accordance with various embodiments of the present disclosure, a movable object can be controlled in-flight based on interactions with image data received from the movable object. The movable object can include an image capture device, which is configured to capture and send live image data to a client device. The client device can display the image data and receive, e.g., gesture-based inputs to the image data. For example, a gesture-based input, such as a swipe, tap, pinch and zoom, etc., can be detected. The system can identify a feature region associated with the gesture-based input and a reference touch point (e.g., a touch point corresponding to an initial position of the user's finger, a release position of the user's finger, a current location of the user's finger, or any other position along the gesture). Based on the difference between the feature region and the reference touch point, as represented on the display, control data can be determined for moving the movable object. As the movable object moves, the change in position of the feature region relative to the reference touch point can be used as feedback, enabling the displayed image to be adjusted based on the detected gesture-based input.

In various embodiments, when a gesture is detected, an initial point on the gesture can be used as the reference touch point. The gesture may be made by a user with their finger or stylus on a touch screen or through any other interface. For example, a head mounted display (such as a virtual reality headset) may be configured to monitor the movement and/or focus of a user's eyes which may be used as inputs to control the movable object. A gesture may be detected based on the monitored movement of the user's eyes and/or head. As discussed, the reference touch point can be regularly (e.g., periodically, continuously, or intermittently) updated. For example, as the gesture is made, additional points along the gesture may be used as the reference touch point. In some embodiments, the current touch point corresponding to the location of the current location user's finger may be used as the reference touch point and updated as the user moves his or her finger. This way, the orientation of the image follows the gesture.

Figure 1:
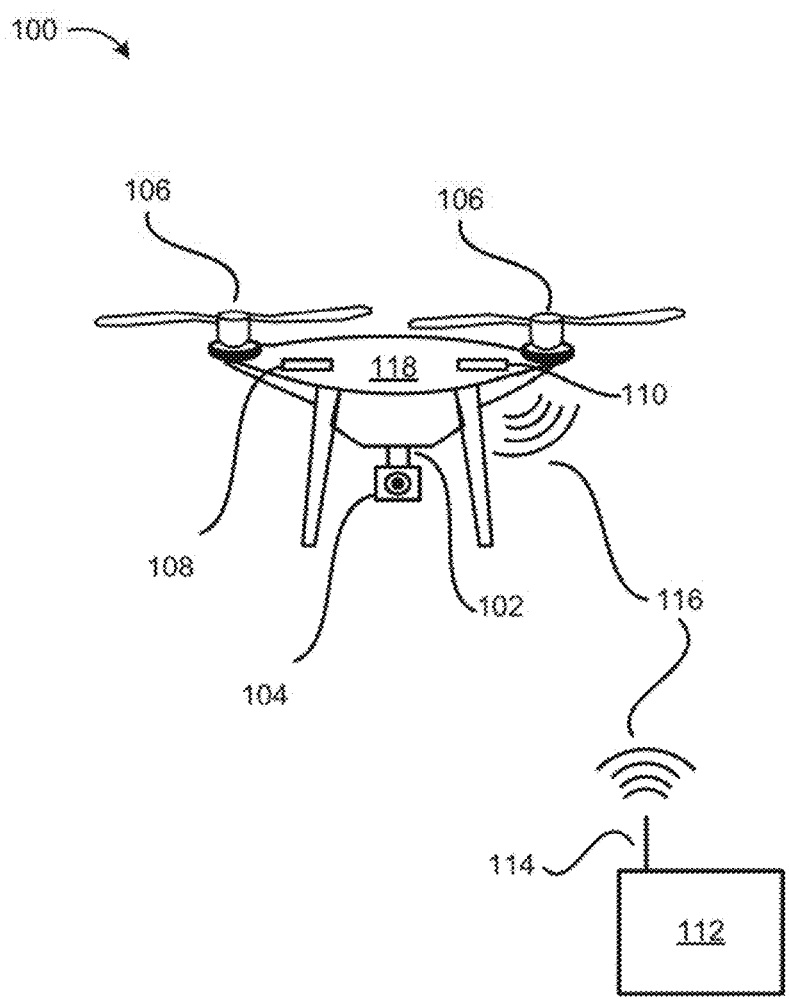
FIG. 1 illustrates a movable object environment, in accordance with various embodiments of the present disclosure.

FIG. 1 illustrates a movable object environment, in accordance with various embodiments of the present disclosure. As shown in FIG. 1, a movable object 118 in a movable object environment 100 can include a carrier 102 and a payload 104. Although the movable object 118 can be depicted as an aircraft, this depiction is not intended to be limiting, and any suitable type of movable object can be used. One of skill in the art would appreciate that any of the embodiments described herein in the context of aircraft systems can be applied to any suitable movable object (e.g., a UAV). In some instances, the payload 104 may be provided on the movable object 118 without requiring the carrier 102.

In accordance with various embodiments of the present disclosure, the movable object 118 may include one or more movement mechanisms 106 (e.g. propulsion mechanisms), a sensing system 108, and a communication system 110.

The movement mechanisms 106 can include one or more of rotors, propellers, blades, engines, motors, wheels, axles, magnets, nozzles, animals, or human beings. For example, the movable object may have one or more propulsion mechanisms. The movement mechanisms 106 may all be of the same type. Alternatively, the movement mechanisms 106 can be different types of movement mechanisms. The movement mechanisms 106 can be mounted on the movable object 118 (or vice-versa), using any suitable means such as a support element (e.g., a drive shaft). The movement mechanisms 106 can be mounted on any suitable portion of the movable object 118, such on the top, bottom, front, back, sides, or suitable combinations thereof.

In some embodiments, the movement mechanisms 106 can enable the movable object 118 to take off vertically from a surface or land vertically on a surface without requiring any horizontal movement of the movable object 118 (e.g., without traveling down a runway). Optionally, the movement mechanisms 106 can be operable to permit the movable object 118 to hover in the air at a specified position and/or orientation. One or more of the movement mechanisms 106 may be controlled independently of the other movement mechanisms. Alternatively, the movement mechanisms 106 can be configured to be controlled simultaneously. For example, the movable object 118 can have multiple horizontally oriented rotors that can provide lift and/or thrust to the movable object. The multiple horizontally oriented rotors can be actuated to provide vertical takeoff, vertical landing, and hovering capabilities to the movable object 118. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 118 (e.g., with respect to up to three degrees of translation and up to three degrees of rotation).

The sensing system 108 can include one or more sensors that may sense the spatial disposition, velocity, and/or acceleration of the movable object 118 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 108 can be used to control the spatial disposition, velocity, and/or orientation of the movable object 118 (e.g., using a suitable processing unit and/or control module). Alternatively, the sensing system 108 can be used to provide data regarding the environment surrounding the movable object, such as weather conditions, proximity to potential obstacles, location of geographical features, location of manmade structures, and the like.

The communication system 110 enables communication with terminal 112 having a communication system 114 via wireless signals 116. The communication systems 110, 114 may include any number of transmitters, receivers, and/or transceivers suitable for wireless communication. The communication may be one-way communication, such that data can be transmitted in only one direction. For example, one-way communication may involve only the movable object 118 transmitting data to the terminal 112, or vice-versa. The data may be transmitted from one or more transmitters of the communication system 110 to one or more receivers of the communication system 112, or vice-versa. Alternatively, the communication may be two-way communication, such that data can be transmitted in both directions between the movable object 118 and the terminal 112. The two-way communication can involve transmitting data from one or more transmitters of the communication system 110 to one or more receivers of the communication system 114, and vice-versa.

In some embodiments, the terminal 112 can provide control data to one or more of the movable object 118, carrier 102, and payload 104 and receive information from one or more of the movable object 118, carrier 102, and payload 104 (e.g., position and/or motion information of the movable object, carrier or payload; data sensed by the payload such as image data captured by a payload camera; and data generated from image data captured by the payload camera). In some instances, control data from the terminal may include instructions for relative positions, movements, actuations, or controls of the movable object, carrier, and/or payload. For example, the control data may result in a modification of the location and/or orientation of the movable object (e.g., via control of the movement mechanisms 106), or a movement of the payload with respect to the movable object (e.g., via control of the carrier 102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable object, carrier and/or payload may include information from one or more sensors (e.g., of the sensing system 108 or of the payload 104) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data transmitted by the terminal 112 can be configured to control a state of one or more of the movable object 118, carrier 102, or payload 104. Alternatively or in combination, the carrier 102 and payload 104 can also each include a communication module configured to communicate with terminal 112, such that the terminal can communicate with and control each of the movable object 118, carrier 102, and payload 104 independently.

In some embodiments, the movable object 118 can be configured to communicate with another remote device in addition to the terminal 112, or instead of the terminal 112. The terminal 112 may also be configured to communicate with another remote device as well as the movable object 118. For example, the movable object 118 and/or terminal 112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 118, receive data from the movable object 118, transmit data to the terminal 112, and/or receive data from the terminal 112. Optionally, the remote device can be connected to the Internet or other telecommunications network, such that data received from the movable object 118 and/or terminal 112 can be uploaded to a website or server.

Figure 2:
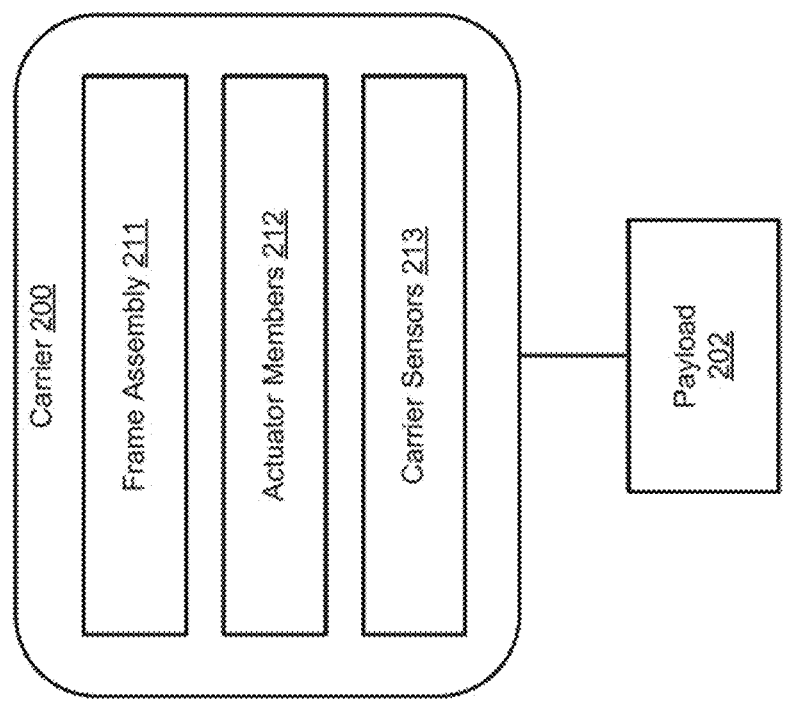
FIG. 2 illustrates an exemplary carrier in a movable object environment, in accordance with embodiments.
Figure 2:

FIG. 2 illustrates an exemplary carrier in a movable object environment, in accordance with embodiments. The carrier 200 can be used to couple a payload 202 such as an image capturing device to a movable object such as a UAV.

The carrier 200 can be configured to permit the payload 202 to rotate about one or more axes, such as three axes: X or pitch axis, Z or roll axis, and Y or yaw axis, relative to the movable object. For instance, the carrier 200 may be configured to permit the payload 202 to rotate only around one, two, or three of the axes. The axes may or may not be orthogonal to each other. The range of rotation around any of the axes may or may not be limited and may vary for each of the axes. The axes of rotation may or may not intersect with one another. For example, the orthogonal axes may intersect with one another. They may or may not intersect at a payload 202. Alternatively, they may not intersect.

The carrier 200 can include a frame assembly 211 comprising one or more frame members. For example, a frame member can be configured to be coupled with and support the payload 202 (e.g., image capture device).

In some embodiments, the carrier 200 can comprise one or more carrier sensors 213 useful for determining a state of the carrier 200 or the payload 202 carried by the carrier 200. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload 202. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors 213 may be coupled to any suitable portion or portions of the carrier (e.g., frame members and/or actuator members) and may or may not be movable relative to the UAV. Additionally or alternatively, at least some of the carrier sensors may be coupled directly to the payload 202 carried by the carrier 200.

The carrier sensors 213 may be coupled with some or all of the actuator members of the carrier. For example, three carrier sensors can be respectively coupled to the actuator members 212 for a three-axis carrier and configured to measure the driving of the respective actuator members 212 for the three-axis carrier. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator member that it measures. For example, a first potentiometer can be used to generate a first position signal for the first actuator member, a second potentiometer can be used to generate a second position signal for the second actuator member, and a third potentiometer can be used to generate a third position signal for the third actuator member. In some embodiments, carrier sensors 213 may also be coupled to some or all of the frame members of the carrier. The sensors may be able to convey information about the position and/or orientation of one or more frame members of the carrier and/or the image capturing device. The sensor data may be used to determine position and/or orientation of the image capturing device relative to the movable object and/or a reference frame.

The carrier sensors 213 can provide position and/or orientation data that may be transmitted to one or more controllers (not shown) on the carrier or movable object. The sensor data can be used in a feedback-based control scheme. The control scheme can be used to control the driving of one or more actuator members such as one or more motors. One or more controllers, which may be situated on a carrier or on a movable object carrying the carrier, can generate control signals for driving the actuator members. In some instances, the control signals can be generated based on data received from carrier sensors indicative of the spatial disposition of the carrier or the payload 202 carried by the carrier 200. The carrier sensors may be situated on the carrier or the payload 202, as previously described herein. The control signals produced by the controllers can be received by the different actuator drivers. Based on the control signals, the different actuator drivers may control the driving of the different actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier 200 can be coupled indirectly to the movable object via one or more damping elements. The damping elements can be configured to reduce or eliminate movement of the load (e.g., payload, carrier, or both) caused by the movement of the movable object (e.g., UAV). The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the movable object that are transmitted to the load. For example, the motion may include vibrations caused by the operation of a propulsion system and/or other components of a movable object.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load. The motion damping applied by the damping elements may be used to stabilize the load, thereby improving the quality of images captured by the load (e.g., image capturing device), as well as reducing the computational complexity of image stitching steps required to generate a panoramic image based on the captured images.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. For example, damping elements can include rubber balls that are substantially spherical in shape. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. In some instances, the damping elements may have viscoelastic properties. The properties of the damping elements may be isotropic or anisotropic. For instance, the damping elements may provide motion damping equally along all directions of motion. Conversely, the damping element may provide motion damping only along a subset of the directions of motion (e.g., along a single direction of motion). For example, the damping elements may provide damping primarily along the Y (yaw) axis. As such, the illustrated damping elements can be configured to reduce vertical motions.

Although various embodiments may be depicted as utilizing a single type of damping elements (e.g., rubber balls), it shall be understood that any suitable combination of types of damping elements can be used. For example, the carrier may be coupled to the movable object using one or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the movable objects. In some instances, the load can be embedded within or enclosed by one or more damping elements.

Figure 3:
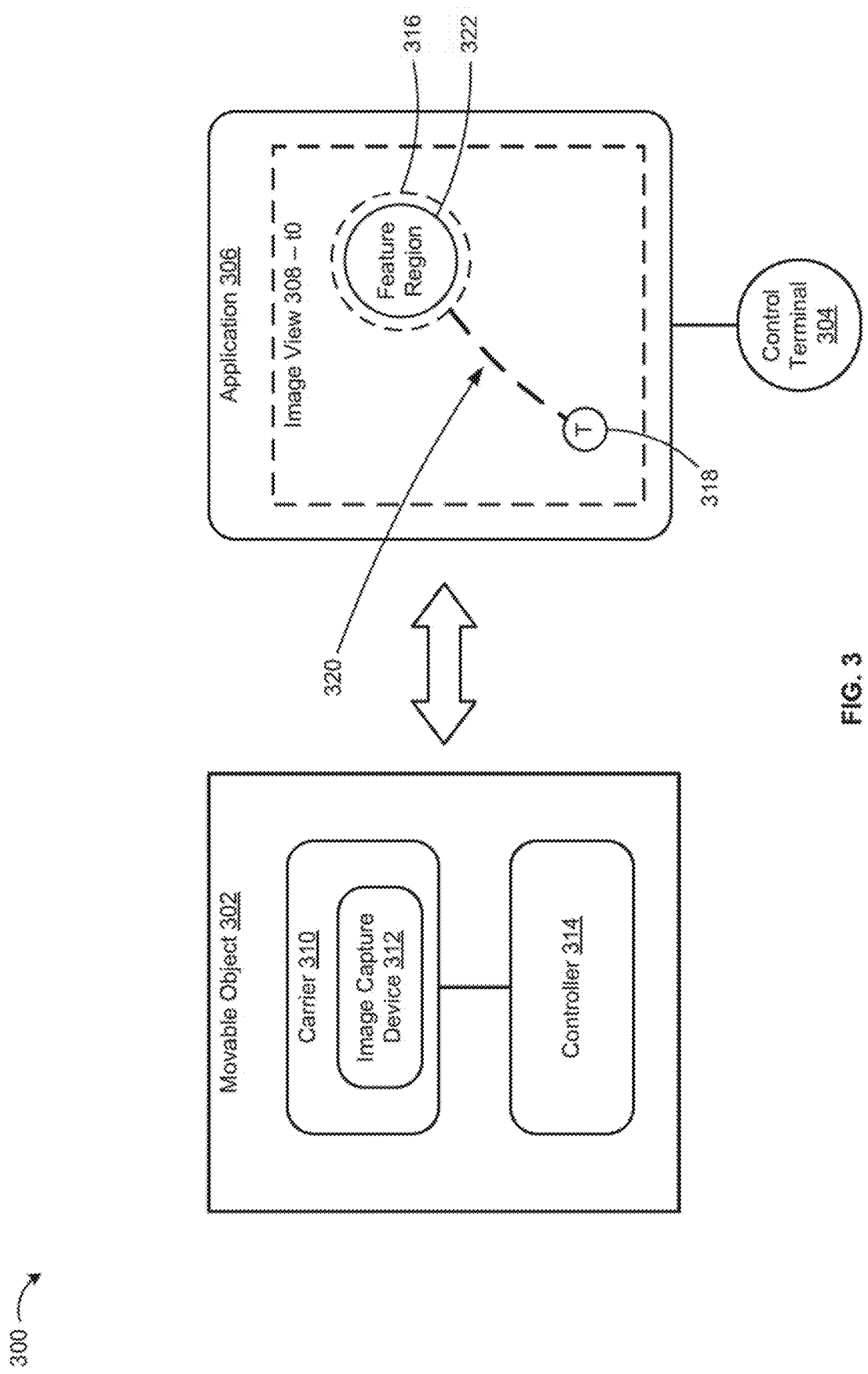
FIG. 3 illustrates a system that provides image-based navigation in a movable object environment, in accordance with various embodiments of the present disclosure.

FIG. 3 illustrates a system 300 that provides image-based navigation in a movable object environment, in accordance with various embodiments of the present disclosure. As shown in FIG. 3, system 300 may enable a movable object 302 to be controlled based on inputs received through application 306 executing on control terminal 304. Application 306 can include a live image view 308. Although the movable object 302 is depicted as an unmanned aerial vehicle (UAV), this depiction is not intended to be limiting, and any suitable type of movable object can be used, as described herein. One of skill in the art would appreciate that any of the embodiments described herein in the context of aircraft systems can be applied to any suitable movable object. Similarly, although control terminal 304, application 306, and image view 308 are described with respect to a tablet computer or smartphone and touchscreen implementation, any client device capable of displaying or otherwise relaying visual data and receiving gesture-based inputs related to the visual data may be used.

In some embodiments, the movable object 302 can include a carrier 310 and an image capture device 312. The carrier 310 may permit the image capture device 312 to move relative to the movable object 302. For instance, the carrier 310 (e.g. a gimbal) may permit the image capture device 312 to rotate around one or more axes. Alternatively or additionally, the carrier 310 may permit the image capture device 312 to move linearly along one or more axes. The axes for the rotational or translational movement may or may not be orthogonal to each other.

In some embodiments, the image capture device 312 may be rigidly coupled to or connected with the movable object 302 such that the image capture device 312 remains substantially stationary relative to the movable object 302. For example, the carrier 310 that connects the movable object 302 and the image capture device 312 may not permit the payload 301 to move relative to the movable object 302. Alternatively, the payload 104 may be coupled directly to the movable object 101 without requiring a carrier.

In some embodiments, the movable object 302 or carrier 310 can include one or more sensors. Examples of such sensors may include an optical sensor (e.g., camera or camcorder, infrared imaging device, ultraviolet imaging device, or the like), an audio capture device (e.g., a parabolic microphone), or the like. Any suitable sensor(s) can be incorporated into the image capture device 312 to capture any visual, audio, electromagnetic, or any other desirable signals. The sensors can provide static sensing data (e.g., a photograph) or dynamic sensing data (e.g., a video). The sensors may capture sensing data continuously in real time or at high frequencies.

In some embodiments, the movable object 302 can be configured to provide and the control terminal 304 can be configured to receive data such as sensing data acquired by sensors onboard the movable object 302. Examples of sensing data may include optical, audio, location, attitude, or other data acquired by one or more sensors carried by the movable object 302 or other data acquired by other sensors. For example, as discussed, real-time or nearly real-time video can be streamed from the movable object 302 and/or the image capture device 312 to the control terminal 304. The sensing data may also include data acquired by global positioning system (GPS) sensors, motion sensors, inertial sensors, proximity sensors, or other sensors. In various embodiments, the data received by the control terminal may include raw data (e.g., raw sensing data as acquired by the sensors) and/or processed data (e.g., tracking information as processed by one or more processors on the movable object).

In some embodiments, the control terminal 304 can be located at a location distant or remote from the movable object 302, carrier 310, and/or image capture device 312. The control terminal 304 can be disposed on or affixed to a support platform. Alternatively, the control terminal 304 can be a client device, including a handheld device or wearable device. For example, the control terminal 311 can include a smartphone, tablet, laptop, computer, glasses, gloves, helmet, microphone, or suitable combinations thereof. Also, the control terminal 304 can support the running of one or more applications 306 (such as mobile apps).

The control terminal 304 can be configured to display data received from the movable object 302 via a display. The displayed data may include sensing data such as images (e.g., still images and videos) acquired by an imaging device carried by the movable object 302. The displayed data may also include information that is displayed separately from the image data or superimposed on top of the image data. For example, the display may be configured to display the images where feature regions or objects are indicated or highlighted with an indicator such as a box, circle, or any other geometric shape surrounding the feature region or object. In some embodiments, a trace or outline of a received gesture can be superimposed on the image data and can change in size based on the movement of the movable object. For example, as the image view adjusts, the gesture trace may reduce in size. In some embodiments, the images and the tracking indicator are displayed in substantially real-time as the image data and tracking information are received from the movable object and/or as the image data is acquired. In other embodiments, the display may be provided after some delay.

The control terminal 304 can be configured to receive user input via an input device. The input device may include a joystick, keyboard, mouse, stylus, microphone, image or motion sensor, inertial sensor, touchscreen, object tracker, and the like. Any suitable user input can be used to interact with the terminal, such as manually entered commands, voice control, gesture control, or position control (e.g., via a movement, location or tilt of the terminal). For instance, the control terminal 304 may be configured to allow a user to control a state of the movable object, carrier, payload, or any component thereof by manipulating a joystick, changing an orientation or attitude of the control terminal, interacting with a graphical user interface using a keyboard, mouse, finger, or stylus, or by using any other suitable methods.

In some embodiments, the control terminal 304 can be configured to provide control data or data that can be used by a controller 314 on board the movable object 302 for generating the control data. The control data can be used for controlling, directly or indirectly, aspects of the movable object 302. In some embodiments, the control data can include navigation commands for controlling navigational parameters of the movable object such as the position, speed, orientation, or attitude of the movable object 302. For example, the control data can be used to control flight of a movable object. The control data may affect operation of one or more propulsion units that may affect the flight of the movable object. In other cases, the control data can include commands for controlling individual components of the movable object 302.

In some embodiments, the control data may include information for controlling the operations of the carrier 310. For example, the control data may be used to control an actuation mechanism of the carrier 310 to cause angular and/or linear movement of the image capture device 312 relative to the movable object 302. As another example, the control data may be used to control the movement of the carrier 310. As another example, the control data may be used to adjust one or more operational parameters for the image capture device 312 such as taking still or moving pictures, zooming in or out, turning on or off, switching imaging modes, change image resolution, changing focus, changing depth of field, changing exposure time, changing speed of lens, changing viewing angle or field of view, or the like. In other embodiments, the control data may be used to control a sensing system (not show), communication system (not shown), and the like, of the movable object 302.

In some embodiments, the control data from the control terminal 304 can include data associated with a gesture-based input received through application 306, which can be used by a controller 304 on board the movable object 302 for generating the control data. For example, image capture device 312 can capture and stream live image data to application 306 which may display the live image data as image view 308. The image view 308 may include any natural or man-made objects or structures such geographical landscapes (e.g., mountains, vegetation, valleys, lakes, or rivers), buildings, vehicles (e.g., aircrafts, ships, cars, trucks, buses, vans, or motorcycle), people, or animals in the vicinity of movable object 302. A gesture-based input (e.g., a swipe, pinch, tap, or other gesture) may be received through application 306. For example, where image view 308 is displayed on a touchscreen, a gesture-based input may be received when the gesture is detected by the touchscreen. In various embodiments, image view 308 may be displayed by various client devices and gestures may be detected according to the capabilities of the client device. For example, a virtual reality head mounted display may display image view 308 and monitor a user's eye position (e.g., focus, direction, etc.) and detect gestures based on the movement of the user's eyes. In some cases, application 306 and/or movable object 302 may be configured to perform object recognition on the image data captured by image capture device 312 to identify particular objects (e.g., buildings, landmarks, people, vehicles, etc.) represented in the image data. Details of known objects (e.g., a building's height and elevation, and location coordinates) may be determined for recognized objects.

In some embodiments, when a gesture is detected the system can determine a type of gesture. For example, a swipe gesture may be determined to include a touch point 316 (e.g., the beginning of a gesture), a release point 318 (e.g., the end of a gesture), and various points in between along the gesture 320, within the coordinate system of the image view 308. A pinch and zoom gesture may be determined to have multiple touch points and multiple release points. Other gestures may be associated with different combinations of touch points, release points, and intervening motions. Based on the touch point and the release point coordinates, a magnitude and direction of the gesture can be determined. Additionally, or alternatively, a feature region 322 associated with the touch point(s) can be identified in the image data. The feature region 322 may include an area of image view 308 similar in size to the finger or stylus used to make contact with the image view 308. In some embodiments, the size of the feature region may be a configurable value, set by a user, administrator, manufacturer, or other entity. Within the feature region, one or more feature points may be identified. The feature points may correspond to one or more visual characteristics represented in the image view, such as areas of high contrast, edges, regions of interest, or other features that may be identified using computer vision and image processing techniques.

Once the one or more feature points are identified, the coordinates of the feature points in the image view can be tracked. The current position information for the feature points can be compared with coordinates of the detected gesture. Based at least in part on a difference between the current position of the feature point in the image view and a reference point, such as the release point of the gesture, control signals may be generated (e.g., by one or more processors onboard the movable object) that cause adjustment that change the position of the movable object 302 to reduce the difference between the displayed position of the feature region 322 and the release point 318 of the gesture.

The adjustment may pertain to the movable object, the carrier, and/or image capture device (or other payload). For example, the adjustment may cause the movable object and/or the payload (e.g., image capture device) to change its position, attitude, orientation, angular and/or linear velocity, angular and/or linear velocity, and the like. The adjustment may cause the carrier to move the payload (e.g., image capture device) relative to the movable object such as around or along one, two, three, or more axes. Furthermore, the adjustment may include adjustment to the zoom, focus, or other operational parameters of the payload (e.g., image capture device) itself (e.g., zoom in/out).

In some embodiments, the adjustment may be generated based at least in part on the type of detected gesture. For example, a swipe gesture may correspond to a rotation of the movable object and/or the payload (e.g., via the carrier) around one or two rotational axes, while a pinch and zoom gesture may correspond to a change in position of the movable object to be positioned closer to or farther away from a feature region or object of interest (e.g., to increase or decrease the size of feature region 322). Other gestures may correspond to a rotation of the movable object and/or payload around two or three rotational axes, the adjustment of payload settings (e.g., camera zoom), or other adjustments. In some embodiments, multiple gestures may be combined into one input. For example, a multi-touch pinch and zoom gesture may be used to zoom in or zoom out and, while maintaining contact the touch points can be rotated, to adjust the orientation of the view.

In various embodiments, the adjustment corresponding to the detected gesture may be achieved by controlling one or more controllable objects such as the movable object, the carrier, the imaging device, or any combination thereof via control signals. In some embodiments, the controllable objects may be selected to implement an adjustment and the corresponding control signals may be generated based at least in part on the configurations or settings of the controllable objects. For example, an adjustment corresponding to a swipe gesture, e.g., to change the orientation of the image view 308, that involves rotation around two axes (e.g., yaw and pitch) may be achieved solely by corresponding rotation of the movable object around the two axes if the imaging device is rigidly coupled to the movable object and hence not permitted to move relative to the movable object. Such may be the case when the imaging device is directly coupled to the movable object, or when the imaging device is coupled to the movable object via a carrier that does not permit relative movement between the imaging device and the movable object. The same two-axis adjustment may be achieved by combining adjustment to both the movable object and the carrier if the carrier permits the imaging device to rotate around at least one axis relative to the movable object. In this case, the carrier can be controlled to implement the rotation around one or two of the two axes required for the adjustment and the movable object can be controlled to implement the rotation around one or two of the two axes. For example, the carrier may include a one-axis gimbal that allows the imaging device to rotate around one of the two axes required for adjustment while the rotation around the remaining axis is achieved by the movable object. Alternatively, the same two-axis adjustment may be achieved by the carrier alone if the carrier permits the imaging device to rotate around two or more axes relative to the movable object. For instance, the carrier may include a two-axis or three-axis gimbal.

As another example, an adjustment corresponding to a pinch and zoom gesture, e.g., to zoom in or zoom out of the image view, may be achieved by controlling the zoom in/out of the imaging device (e.g., if the imaging device supports the zoom level required), by controlling the movement of the movable object (e.g., so as to get closer to or farther away from a given feature region), or by a combination of zoom in/out of the imaging device and the movement of the movable object. A processor onboard the movable object may make the determination as to which object or combination of objects to adjust. For example, if the imaging device does not support a zoom level required, may be controlled to move instead of or in addition to adjusting the zoom of the imaging device.

Examples of other constraints may include maximum and/or minimum limit for rotation angles, angular and/or linear speed, operational parameters, and the like for the movable object, the carrier, and/or the payload (e.g., imaging device). Such maximum and/or minimum threshold values may be used to limit the range of the adjustment. For example, the angular speed of the movable object and/or the imaging device around a certain axis may be capped by a maximum angular speed that is allowed for the movable object, the carrier, and/or the payload (e.g., imaging device). As another example, the linear speed of the movable object and/or the carrier may be capped by a maximum linear speed that is allowed for the movable object, the carrier, and/or the payload (e.g., imaging device). As yet another example, adjustment to the focal length of the imaging device may be limited by the maximum and/or minimum focal length for the particular imaging device. In some embodiments, such limits may be predetermined and depend on the particular configuration of the movable object, the carrier, and/or the payload (e.g., imaging device). In some instances, such configurations may be configurable (e.g., by a manufacturer, administrator, or user).

Figure 4:
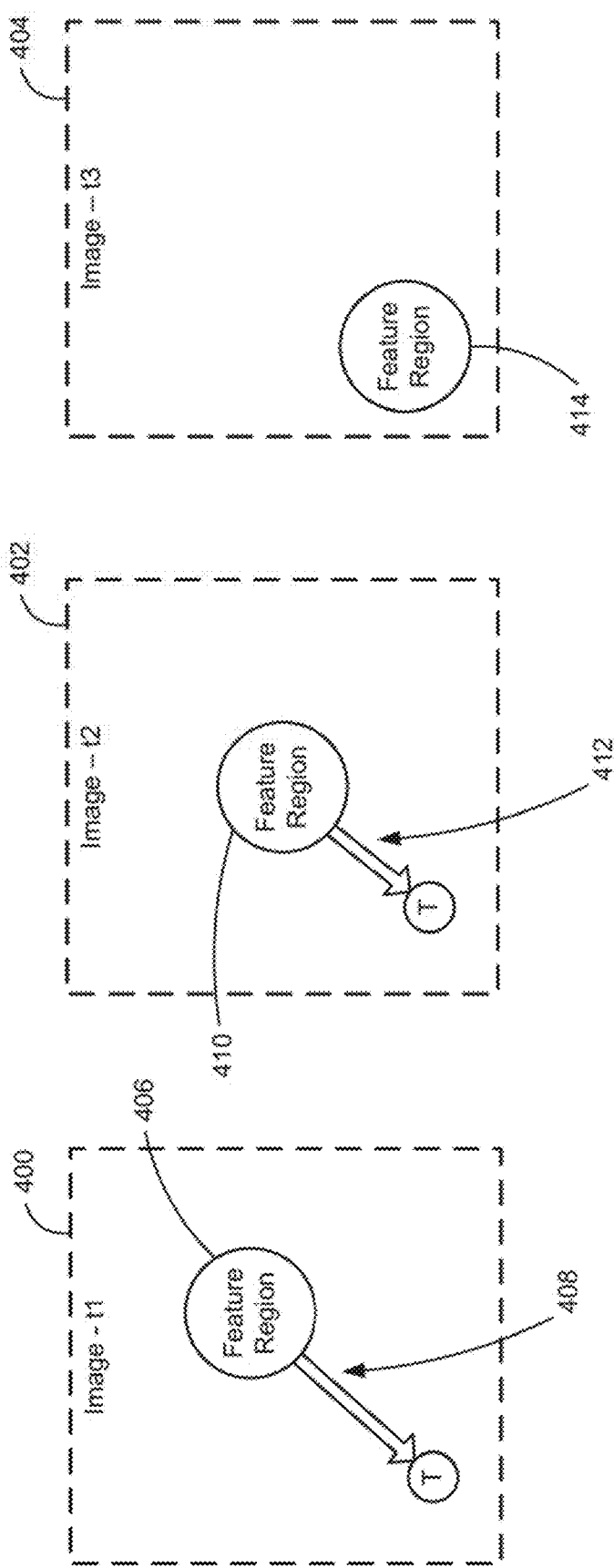
FIG. 4 illustrates using a location of a feature point in an image to control the navigation of a movable object in a movable object environment, in accordance with various embodiments of the present disclosure.

FIG. 4 illustrates using a location of a feature point in an image to control the navigation of a movable object in a movable object environment, in accordance with various embodiments of the present disclosure. As discussed above, the image data shown in image view 308 can be obtained live from image capture device 312. As such, once the control signal begins causing the image capture device 312 and/or movable object 302 to change position and/or attitude, the location of feature region 322 in image view 308 will change. As shown in FIG. 3, image view 308 represents the image data at time t0. In FIG. 4, three additional image views 400, 402, and 404 are shown representing image data at times t1, t2, and t3, respectively. As used herein, the coordinates of a feature region, or point within a gesture (including a touch point and a release point) may represent a center point of that feature region or gesture point. The center point may be determined geometrically or through other techniques, based on the client device that detects the gesture.

As shown in FIG. 4, in image view 400 at time t1, feature region 406 appears closer to release point 318. The coordinates in the image view 400 of feature region 406 can be compared to those of release point 318 to determine a control vector 408. As discussed further below, the control vector can be used by the movable object and/or the application to generate the adjustments described above. This difference, therefore, can serve as a feedback signal, reducing the adjustment until the feature region is represented in the location indicated by the gesture. For example, as shown in image 402, at time t2 feature region 410 is represented at a new location, closer to the release point. Control vector 412, representing the difference in coordinates in the image view 402 between the feature region 410 and the release point 318 is therefore smaller. Adjustments made based on control vector 412 will therefore result in smaller changes than those made based on control vector 408. Image view 404 shows feature region 414 at time t3 in position, overlaying release point 318. The system may determine that feature region is shown in position in the image view 404 by determining that the control vector is smaller than a threshold value or, without calculating a control vector, may determine that the coordinates of the feature region are within a threshold deviation of the coordinates of the release point. Although the embodiment of FIG. 4 is discussed with respect to a release point, any reference touch point may be used to control the image view. For example, release point 318 can represent a current touch point, an initial touch point, or any other point along the gesture.

Figure 5:
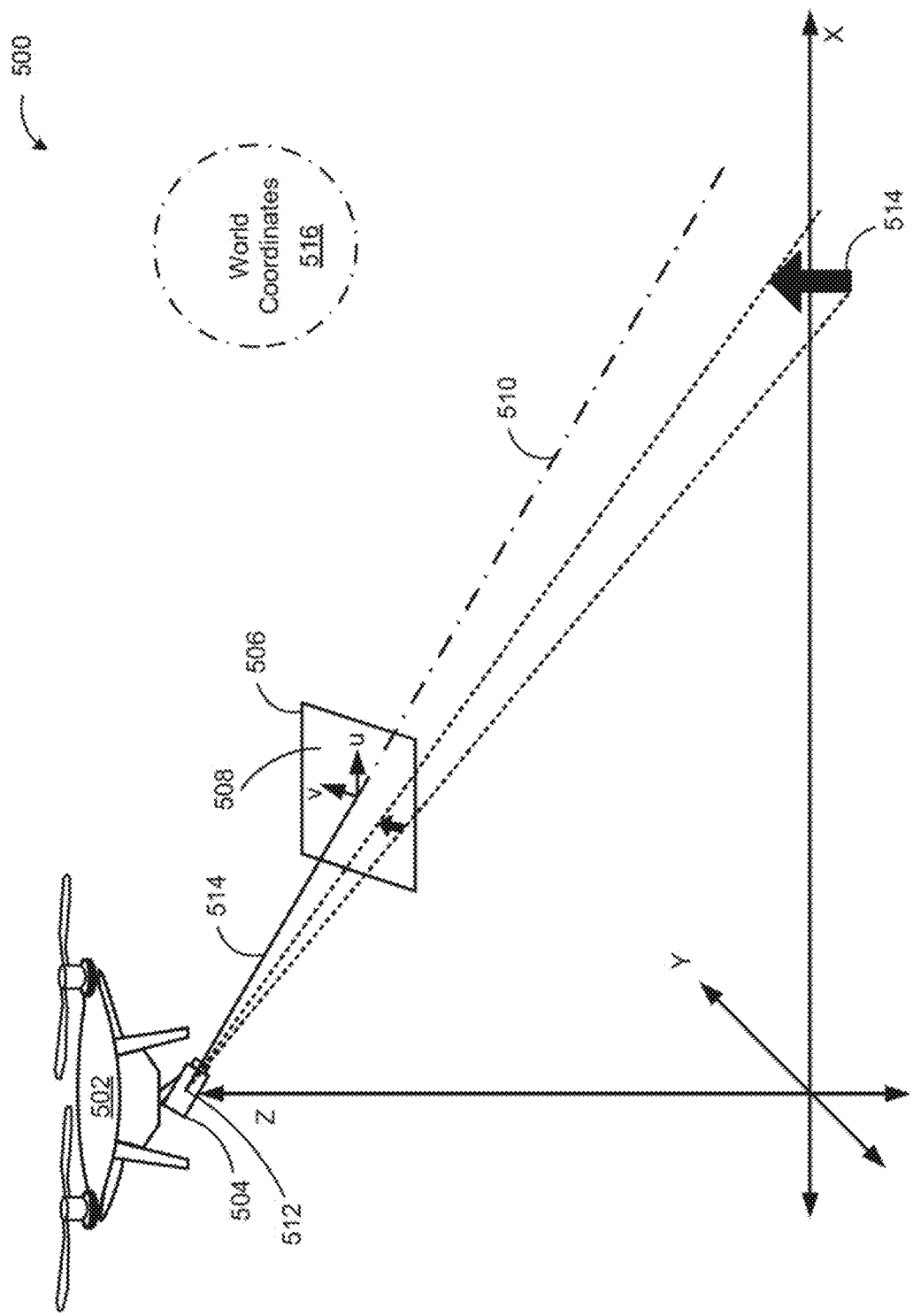
FIG. 5 illustrates projecting objects from a three dimensional coordinate system to a two dimensional coordinate system in a movable object environment, in accordance with various embodiments of the present disclosure.

FIG. 5 illustrates projecting objects from a three dimensional coordinate system to a two dimensional coordinate system in a movable object environment, in accordance with various embodiments of the present disclosure. As shown in FIG. 5, a movable object 502 in a movable object environment 500 can include an image capture device, such as a camera 504. In various embodiments, as discussed above, the camera 504 can be coupled to the movable object 502 via a carrier that enables the attitude of the camera to be controlled independently of, and/or in concert with, the attitude of the movable object 502. The camera 504 can capture image data representing the movable object environment 500. The image data represents a projection of the movable object environment 500 within the field of view of the camera onto an image plane 506 with an image coordinates 508.

As shown in FIG. 5, the imaging of the movable object environment may be represented based on an aperture imaging model, which assumes that a light ray from an object point in a three dimensional space can be projected on an image plane to form an image point. The optical axis 510 can pass through both the mirror center 512 and the image center. The distance between the mirror center and the image center can be equal or substantial similar to the focal length, as represented by solid line 514. For illustration purpose only, the image plane 506 can be moved to the mirror position on the optical axis 510 at a distance representing the focal length from the mirror center 512.

Various objects in movable object environment 500, such as object 514, can be characterized both by world coordinates 516 in the movable object environment 500 and image coordinates 506, representing a projection of the object onto image plane 506. For example, object 514 can have a top point $(x_t, y_t, z_t)$ and a bottom point $(x_b, y_b, z_b)$ in world coordinates 516, which are projected on the image plane 506 as a top image point $(u_t, v_t)$ and a bottom image point $(u_b, v_b)$ respectively in the image. Each object within the field of view of camera 504 can be projected from three-dimensional space to the two-dimensional space of the image plane 506.

The image data, representing a projection of the three dimensional movable object environment onto the two dimensional image plane, can be displayed on one or more reference displays. The locations of objects and/or features represented in the image data may be determined as coordinates on the reference display. For example, a tablet computer may receive and display the image data. The tablet computer may include a touchscreen interface on which the image data is displayed and through which a gesture-based input may be received. The tablet computer may therefore serve as a reference display in which coordinates of touch points corresponding to the gesture-based input and coordinates corresponding to objects and/or features represented in the image data may be determined. The coordinates, determined with respect to the same reference display, may then be used to control the movable object and/or carrier.

Figure 6:
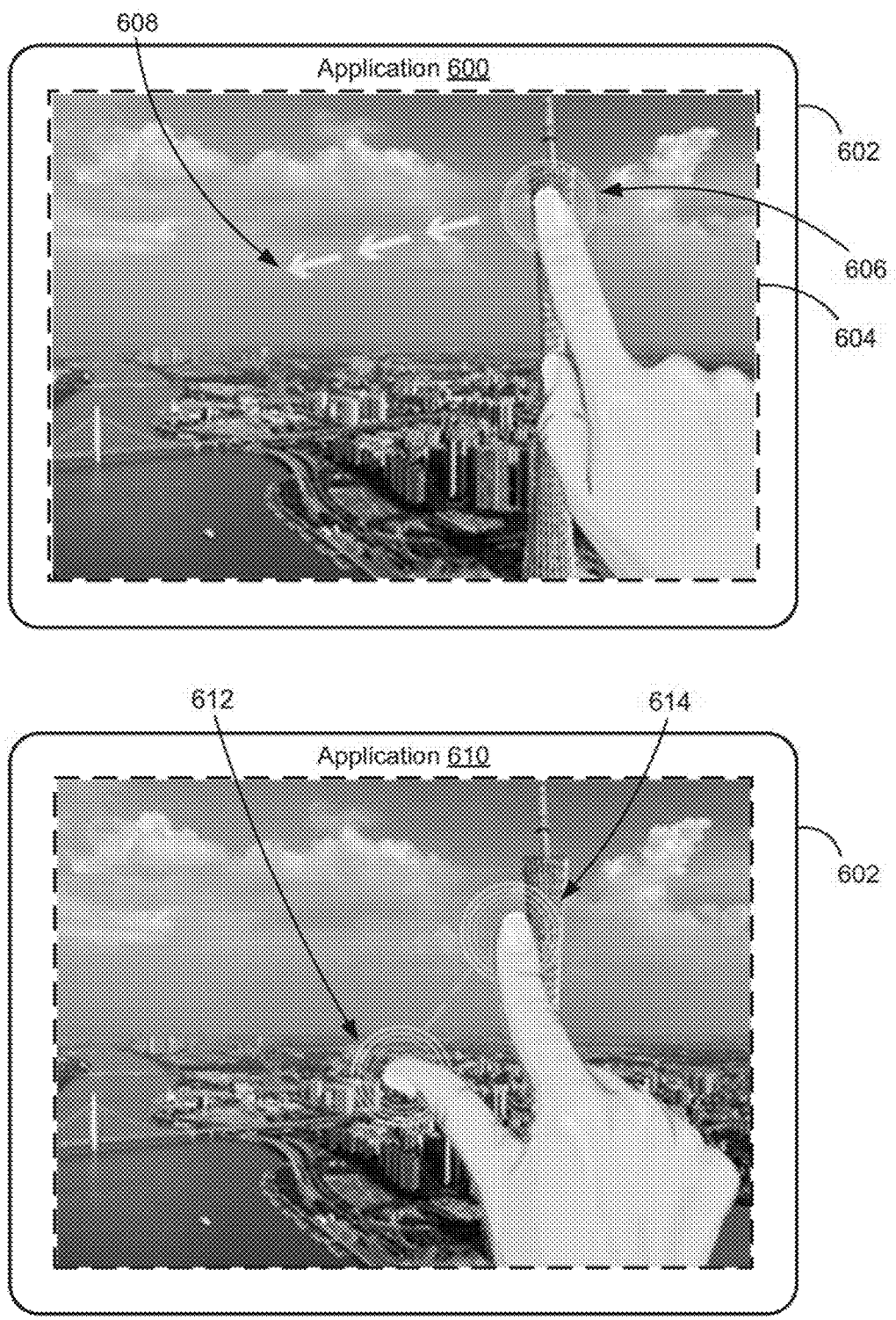
FIG. 6 illustrates exemplary image-based navigation commands, in accordance with various embodiments of the present disclosure.

FIG. 6 illustrates exemplary image-based navigation commands, in accordance with various embodiments of the present disclosure. As discussed above, in various embodiments, a movable object can be controlled by interactions with the image data received from the movable object and/or from an image capture device coupled thereto. As shown in FIG. 6, such interactions can be gesture-based inputs received through a touchscreen interface of a client device. Although embodiments are described herein with respect to a touchscreen interface, other interfaces implemented by client devices may also be used to receive inputs that can be used to control the movable object. For example, a client device may include various position and/or orientation sensors that detect, e.g., the position and/or orientation of the client device as it is manipulated by a user. In some embodiments, the client device may be configured to detect changes in the environment relative to the client device. For example, a head mounted display (such as a virtual reality headset) may be configured to monitor the movement and/or focus of a user's eyes which may be used as inputs to control the movable object. Reference touch points for an eye or head based gesture can include a point on the display where the user is currently focused, an initial point on the display where the user was focused when the gesture was detected, a release point on the display where the user was focused when the gesture ended, or any other point along the gesture.

As shown in FIG. 6, application 600, executing on a client device 602, can display image data 604 captured by a movable object and/or a camera coupled to a movable object. In some embodiments, the image data may be received from the movable object and/or camera that captured the image data or may be received from another data source. For example, image data may be sent to a server (e.g., in a cloud-based infrastructure environment, a content delivery network, or other server environment) and client device 602 may be configured to receive the image data from the server. In some embodiments, client device 602 can include a touchscreen interface, through which one or more input commands can be received. As discussed, these input commands may be received in the form of gesture-based inputs in which the user selects a touch point or points on the touchscreen and, while maintaining contact with the touchscreen, moves to a release point or points on the touchscreen, forming a gesture.

For example, in application 600, a user selects a touch point 606 and swipes to release point 608. As discussed, a feature region around touch point 606 can be analyzed and one or more feature points within the feature region can be identified. As shown in FIG. 6, the feature region includes a portion of a building and various feature points that represent that portion of the building can be identified. The gesture can indicate that the movable object and/or camera should be moved such that the feature points identified at touch point 606 should be represented at release point 608. Similarly, in application 610, a user selects multiple touch points 612, 614 in a pinch and zoom gesture. Feature regions for each touch point 612, 614 can be analyzed and corresponding feature points for each feature region can be identified. The pinch and zoom gesture can indicate that the movable object and/or camera should be moved to zoom in or zoom out (e.g., using a mechanical or digital zoom on a camera, or by moving the movable object from its current position) based on the change in position of the touch points in the gesture. As discussed above, in some embodiments gestures may be combined to cause different changes in view. For example, the pinch and zoom gesture can be combined with a rotate gesture, where touch points 612, 614 are rotated in a substantially circular rotation about a center point between the touch points 612, 614. The view may then be zoomed in and rotated based on the combined gesture.

Figure 7:
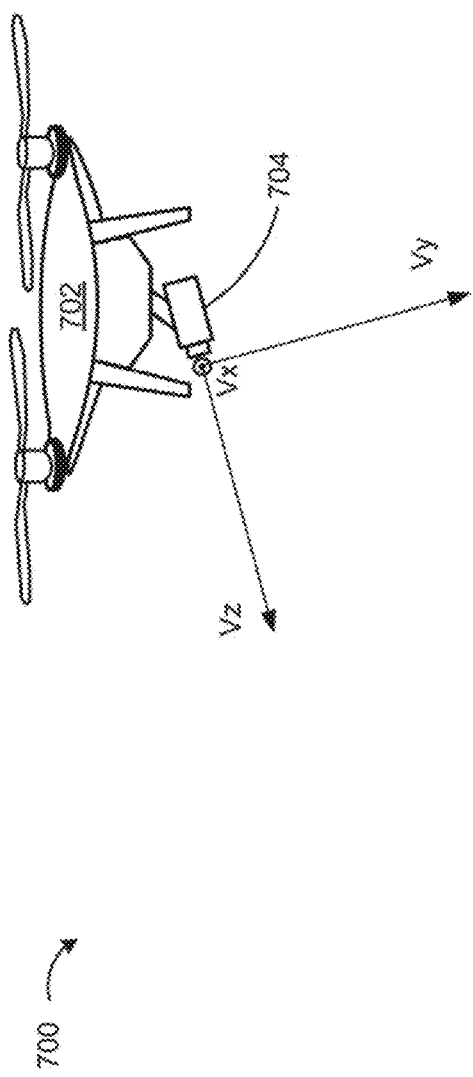
FIG. 7 illustrates image coordinates relative to a movable object in a movable object environment, in accordance with various embodiments of the present disclosure.
Figure 7:
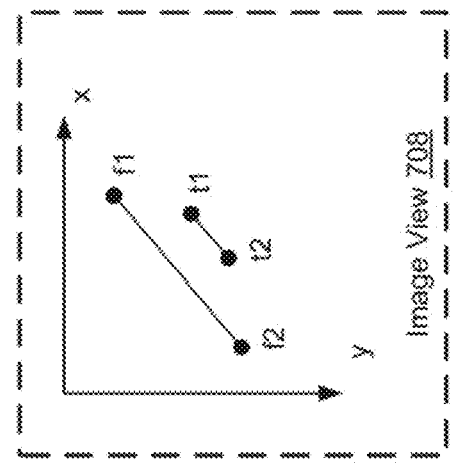
Figure 7:
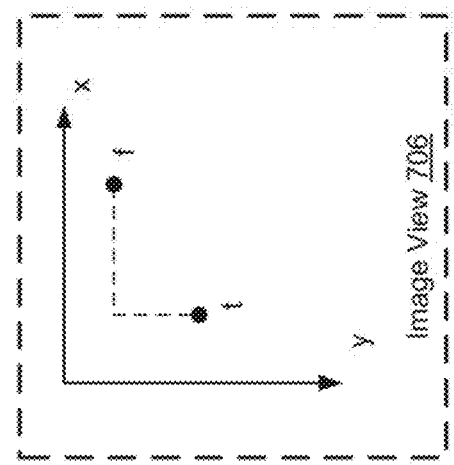

FIG. 7 illustrates image coordinates relative to a movable object in a movable object environment 700, in accordance with various embodiments of the present disclosure. As a result of the projection described above with respect to FIG. 5, a coordinate system can be established based on the attitude of a movable object 702 and/or an image capture device 704 coupled to the movable object.

As shown in FIG. 7, $(V_x, V_y, V_z)$ indicates a coordinate system, with the directions parallel to the lens indicated by $V_x$ (e.g., in a direction orthogonal to the page) and $V_y$, orthogonal to $V_x$, forming the image plane, and the direction orthogonal to the lens indicated by $V_z$. Using this image coordinate system, image views, such as image view 706 and image view 708, can be characterized on an (x, y) plane.

In image view 706, a gesture-based input is received within the image view 706. The initial touch point is represented by point f, and the release point is represented by point t. Although the present example is discussed with respect to a completed gesture, including a touch point and a release point, this is for simplicity of explanation and is not intended to be limiting. Embodiments of the present disclosure can be applied at any point during the gesture, as such point t could be taken to represent any second point in the gesture-based input and is not limited to being the last point in a gesture-based input. Based on the gesture-based input, controls can be calculated. For example, velocity control signals for the movable object, carrier, and/or image capture device in the x and y directions corresponding to the gesture shown in image view 706 can be calculated as follows:

$$V_x = K_{P1} * (X_f - X_t)$$

$$V_y = K_{P2} * (Y_f - Y_t)$$

Accordingly, the greater the distance between the feature region and the release point, the greater the corresponding velocity control signals in the x and y directions. Similarly, as shown in image view 708, for a multi-touch gesture, such as a pinch and zoom gesture, a velocity control signal for the movable object in the z direction can be calculated as follows:

$$V_z = K_{P3} * (\text{Distance}(f_1, f_2) - \text{Distance}(t_1, t_2))$$

where "Distance" indicates a magnitude of a vector connecting the two points, representing how far apart the points are.

As shown above, each velocity control equation includes a control parameter $P_{P1}$, $K_{P2}$, $K_{P3}$, the control parameters can be adjustable (e.g., by a user, manufacturer, administrator, or automatically by the application or controller). The control parameters can be adjusted based on, e.g., the response time of the movable object, environmental conditions, communication latency, or other factors that may impact performance. In some embodiments, the velocity control signals can be calculated by the application and sent to a controller on the movable object to be used to generate corresponding navigation commands for the movable object. As discussed further below, the difference between the coordinates of the feature region and current reference finger position can be used as real-time feedback, enabling the position and orientation of the movable object and/or image capture device to be adjusted in real time to follow the gesture-based input.

Figure 8:
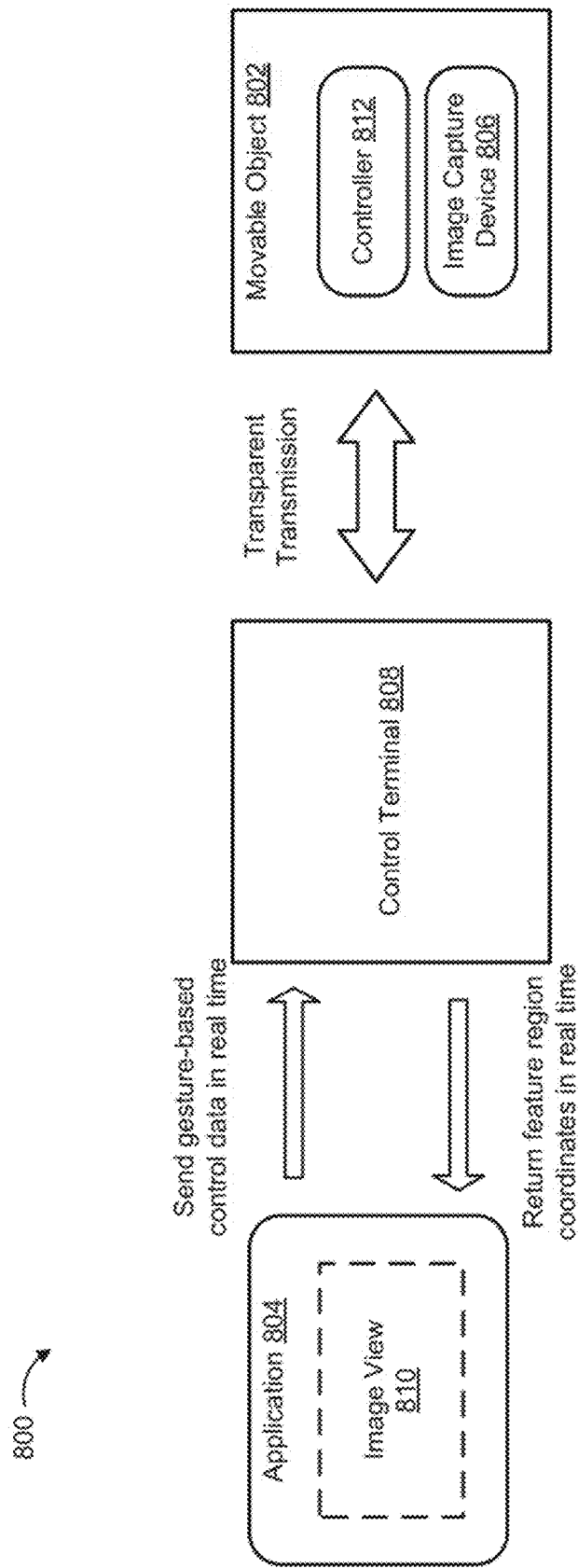
FIG. 8 illustrates a block diagram of a system that provides image-based navigation, in accordance with various embodiments of the present disclosure.

FIG. 8 illustrates a block diagram of a system 800 that provides image-based navigation, in accordance with various embodiments of the present disclosure. As shown in FIG. 8, a movable object 802 can be controlled using an application 804 executing on control terminal 808 or other client device. Movable object 802 can include an image capture device 806 that is configured to capture image data in a movable object environment and send the data to control terminal 808. The image data can be displayed in image view 810 of application 804. As discussed above, image view 810 can include a live, or substantially live, view of image data captured by image capture device 806.

Gesture-based inputs can be received through image view 810. For example, application 804 can be displayed on a touchscreen interface included in, or communicatively coupled to, control terminal 808. As discussed, a gesture-based input can include a swipe, tap, pinch and zoom, or other single-touch or multi-touch gesture. Application 804 can detect a gesture-based input received through image view 810. In some embodiments, application 804 can detect whether the gesture is a single-touch or multi-touch gesture. Additionally, or alternatively, the application 804 can determine coordinates in image view 810 associated with the gesture-based input, including a touch point, release point, and one or more points between the touch point and release point. Application 804 can send the coordinates and an indication of the type of gesture (e.g., single or multi-touch) to the movable object 802 through control terminal 808.

In some embodiments, when a single-touch gesture is detected, a feature region substantially centered on a first touch point of the gesture is identified. As the user's finger moves, the coordinates of the feature region, and of the user's finger, are tracked in real time. As discussed, a control vector, representing the difference between the location of the feature region and the user's finger, can be determined. Based on the control vector, control data, including navigation commands for controlling navigational parameters of the movable object such as the position, speed, orientation, or attitude of the movable object 802 can be determined. In various embodiments, the control data can include instructions to adjust the movable object, the carrier, and/or image capture device (or other payload). In some embodiments, the control data can be determined by application 804 and sent to controller 812 through control terminal 808. In some embodiments, the control data can be determined by controller 812 based on the gesture-based input data received from application 804. Image capture device 806 can continue capturing image data and returning the image data to application 804 through control terminal 808. Until the user completes the gesture (e.g., until a release point is detected), the coordinates of the user's finger on image view 810 can continue to be detected by application 804 and sent to movable object 802. In some embodiments, application 804 can also identify the feature region in the image view 810 as the location of the feature region moves in the image data. The coordinates of the feature region can be returned to movable object 804. In various embodiments, the control data can include instructions, and/or can be used to generate instructions, to adjust the movable object, the carrier, and/or image capture device (or other payload).

Using the control data, the controller 812 can generate navigation commands. For example, if the gesture-based input indicates that the image is to be moved up or down, the navigation instructions can cause the movable object to move up or down, respectively. In some embodiments, the navigation commands can factor in the attitude of the image capture device to maintain the orientation of the image view 810 as the movable object is moved up or down. For example, the navigation commands may cause the movable object to move up or down diagonally relative to a pitch angle of the image capture device, resulting in the image view to appear to move up or down, without changing its orientation. Similarly, if the gesture-based input indicates that the image is to be moved left or right, the navigation commands can cause the movable object 802 to move left or right, respectively, relative to the fuselage, such that the image moves left or right accordingly. In some embodiments, the image capture device 806 may be coupled to the movable object 802 through a carrier that enables the image capture device to move independently of the movable object. The navigation commands can include commands to the carrier to cause the image capture device to move left or right accordingly. Similarly, if the gesture-based input indicates that the image is to be moved diagonally, the navigation commands can cause the movable object to move bidirectionally, such that the image view 810 is adjusted according to the detected gesture.

In some embodiments, where a multi-touch gesture is detected, such as a pinch and zoom gesture, each initial touch point can be identified as a feature region. The difference between the feature regions (e.g., a magnitude of a vector between two initial points) can be determined, and the difference between the locations of the user's fingers can also be determined. As discussed, the difference between these magnitudes can be used to determine control data for the movable object to move in the z-direction. In some embodiments, controller 812 can receive the coordinates from the application 804 and can determine the difference in magnitude and the corresponding navigation commands. In some embodiments, application 804 can determine the difference in magnitude and the controller 812 can use this difference to determine the navigation commands. One of ordinary skill in the art would recognize that the particular processing of control data and navigation commands can be performed by application 804, movable object 804 or any combination thereof. In some embodiments, a remote server in communication with application 804 and movable object 802 may process the coordinates and determine control data and/or navigation instructions.

Figure 9:
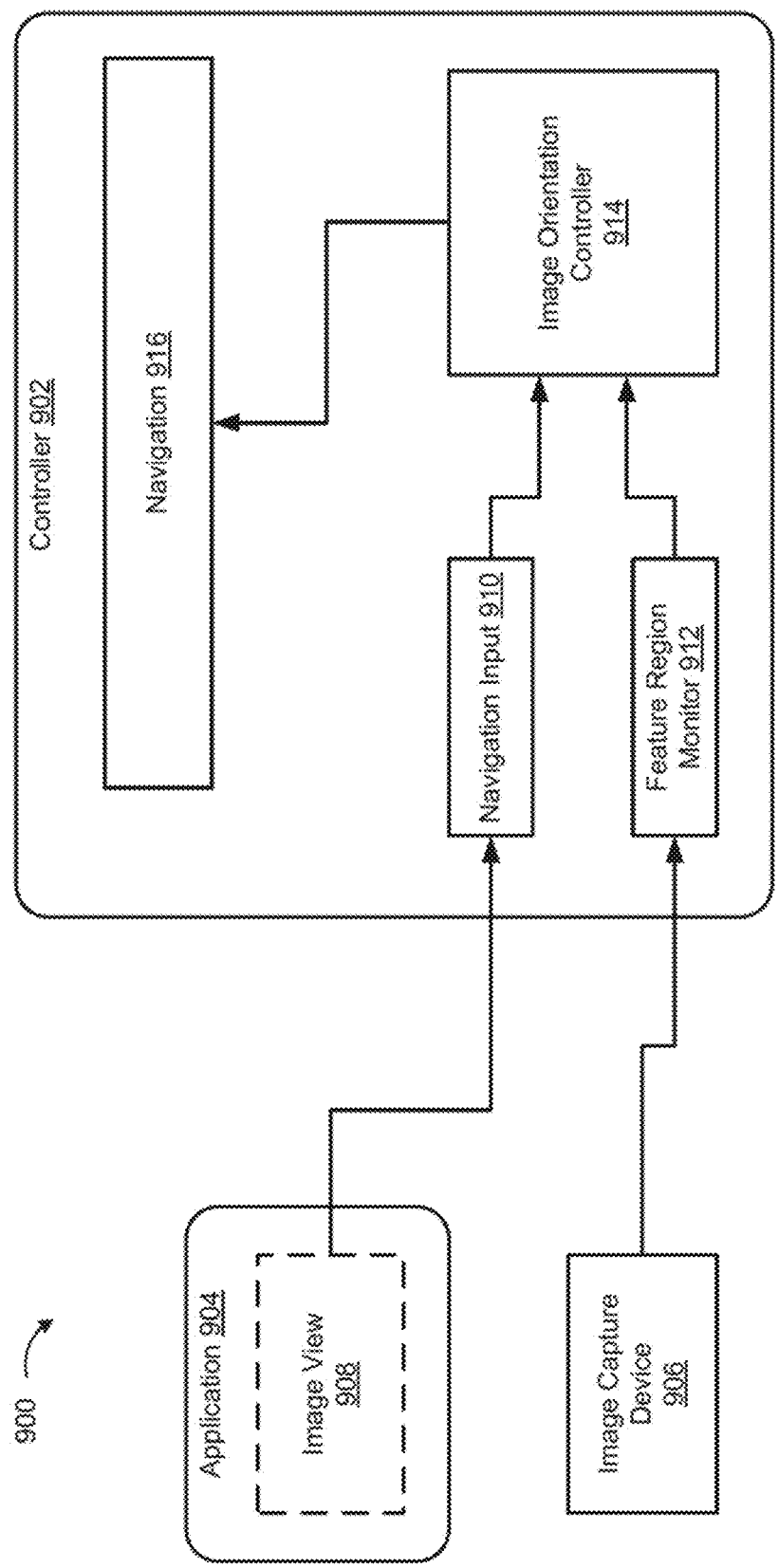
FIG. 9 illustrates a block diagram of a gesture-based control system in a movable object environment, in accordance with various embodiments of the present disclosure.

FIG. 9 illustrates a block diagram of a gesture-based control system 900 in a movable object environment, in accordance with various embodiments of the present disclosure. As discussed above, a controller 902 can determine navigation commands for a movable object based on a gesture-based input received from an application 904. A feature region corresponding to the gesture-based input can be identified in image data captured by image capture device 906 and displayed in image view 908. Coordinates of the reference touch point (e.g., a touch point corresponding to an initial position of the user's finger, a release position of the user's finger, a current location the user is currently touching with a finger, stylus, or other implement, or any other position along the gesture), as well as coordinates of the feature region in the image view 908, can be sent to controller 902. For example, controller 902 can include a navigation input module 910 configured to receive coordinates of the user's reference touch point. In some embodiments, application 904 can also determine coordinates of the feature region in the image view 908. Additionally, or alternatively, controller 902 can receive image data from image capture device 906 and a feature region monitor 912 can identify coordinates of the feature region in the image data.

In accordance with various embodiments of the present disclosure, feature region monitor 912 can determine the similarity between various features in the image data. In some embodiments, the feature region associated with the initial touch point can be stored as a feature model and used to identify the feature region in subsequent image data. In some embodiments, one or more feature points in the feature region can be identified and used to identify the feature region in subsequent image data. For example, a feature model corresponding to the feature region and/or the one or more feature points, can be compared to the subsequent image data to identify a matching region. In some embodiments, a similarity score or value may be calculated for various regions of the subsequent image data based on the comparison. A region having a similarity score above a threshold can be determined to be the feature region of the subsequent image data. Coordinates for the feature region of the subsequent image data can then be determined.

In some embodiments, the coordinates of the reference point (e.g., a current touch point, release point, or any other touch point along the gesture) and the coordinates of the feature region can be received by an image orientation controller 914. As discussed further below, the image orientation controller can determine a difference between the reference touch point and the feature region and determine control data corresponding to the difference. For example, the control data can include velocity control signals to control the speed of the movable object along one or more axes. The control signals can be received by a navigation module 916 that receives the control data from the image orientation controller and generates navigation commands for controlling navigational parameters of the movable object such as the position, speed, orientation, or attitude of the movable object. For example, the navigation commands may affect operation of one or more propulsion units that may affect the flight of the movable object. In other cases, the navigation commands can include commands for controlling individual components of the movable object. In some embodiments, the navigation commands can include commands for controlling a carrier to control the image capture device 906 independently of the movable object.

Figure 10:
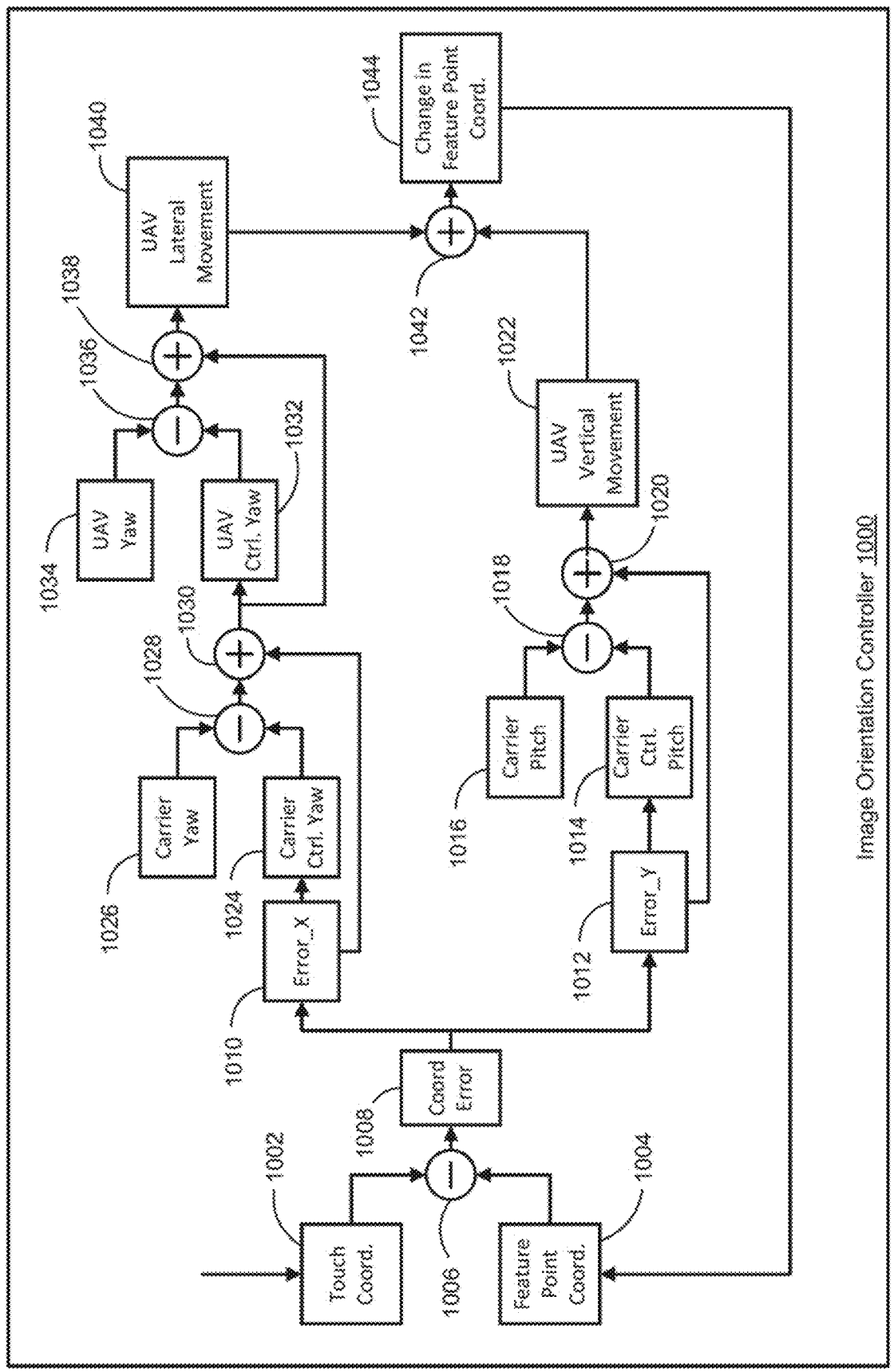
FIG. 10 illustrates a block diagram of an image orientation controller in a movable object environment, in accordance with various embodiments of the present disclosure.

FIG. 10 illustrates a block diagram of an image orientation controller 1000 in a movable object environment, in accordance with various embodiments of the present disclosure. The embodiment shown in FIG. 10 is described with respect to a single-touch input gesture. As discussed, multi-touch gestures are also supported by various embodiments of the present disclosure and may be associated with similar control diagrams, as would be understood by one of ordinary skill in the art. As discussed, at 1002 coordinates in the image view corresponding to a reference touch point can be received by image orientation controller 1000. As discussed, the reference touch point can include a touch point corresponding to an initial position of the user's gesture, a release position of the user's gesture, a current location of the user's gesture, or any other position along the gesture. Additionally, at 1004 coordinates corresponding to the feature region (or one or more feature points) can be received. The difference 1006 between the coordinates can be determined to generate a control vector representing the error (e.g., difference) between the two sets of coordinates. The control vector includes both a X component 1010 and a Y component 1012, each representing the error (e.g., difference) between the touch coordinates and the feature region coordinates in the X direction and Y direction, respectively.

As shown in FIG. 10, the Y component of the control vector can be first used as a control signal for the carrier pitch. A carrier control pitch signal 1014 can be determined based on the Y error 1012 and subtracted from the current carrier pitch value 1016. As discussed above, a carrier pitch sensor can be used to determine the current pitch position of the carrier. The current carrier pitch value 1016 can be negatively combined 1018 with the carrier control pitch signal 1014. The resulting carrier pitch control signal can then be additively combined 1020 with the Y error signal 1012. The resulting control signal can then be used to drive the vertical movement 1022 of the movable object. As such, the carrier pitch can be adjusted first based on the Y error signal, and if the carrier pitch adjustment is adequate, the resulting movable object vertical movement can be reduced or eliminated. If the current carrier pitch is such that the image capture device cannot be further adjusted, then the adjustment is made by adjusting the vertical position of the movable object.

Additionally, as shown in FIG. 10, the X error 1010 can similarly be used to control the carrier yaw. As in the carrier pitch described above, the X error 1010 can be used to determine a carrier yaw control signal 1024 which can be negatively combined 1028 with a current carrier yaw value 1026. As discussed above, a carrier yaw sensor can be used to determine the current yaw position of the carrier. The resulting carrier yaw control signal can then be additively combined 1030 with the X error signal 1010. The resulting carrier-adjusted yaw control signal can then be used to determine a yaw control signal for the movable object 1032. As such, the carrier yaw can be adjusted first based on the X error signal, and if the carrier yaw adjustment is adequate, the resulting movable object yaw movement can be reduced or eliminated. If the current carrier yaw is such that the image capture device cannot be further adjusted, then the adjustment is made by adjusting the yaw of the movable object. The yaw control signal 1032 for the movable object can be negatively combined 1036 with a current yaw position of the movable object 1034. The resulting control signal can be additively combined 1038 with the carrier adjusted yaw control signal to drive the lateral movement 1040 of the movable object.

The resulting lateral movement 1040 and vertical movement 1022 control signals can be combined 1042 and used to generate navigation commands and the movable object can be caused to move accordingly. New coordinates for the feature region can then be determined 1044 and used as feedback for the image orientation controller and used as the new value for feature region coordinates 1004. Additionally, or alternatively, new coordinates for the current touch point 1002 can also be determined and the control loop can continue to process. In some embodiments, the control loop can continue until the coordinate error 1008 is driven to zero or below a minimum threshold value.

In accordance with various embodiments of the present disclosure, image orientation controller 1000 can be implemented as one or more hardware and/or software controllers, including, e.g., a proportional-integral-derivative controller (PID controller) or other controller.

Figure 11:
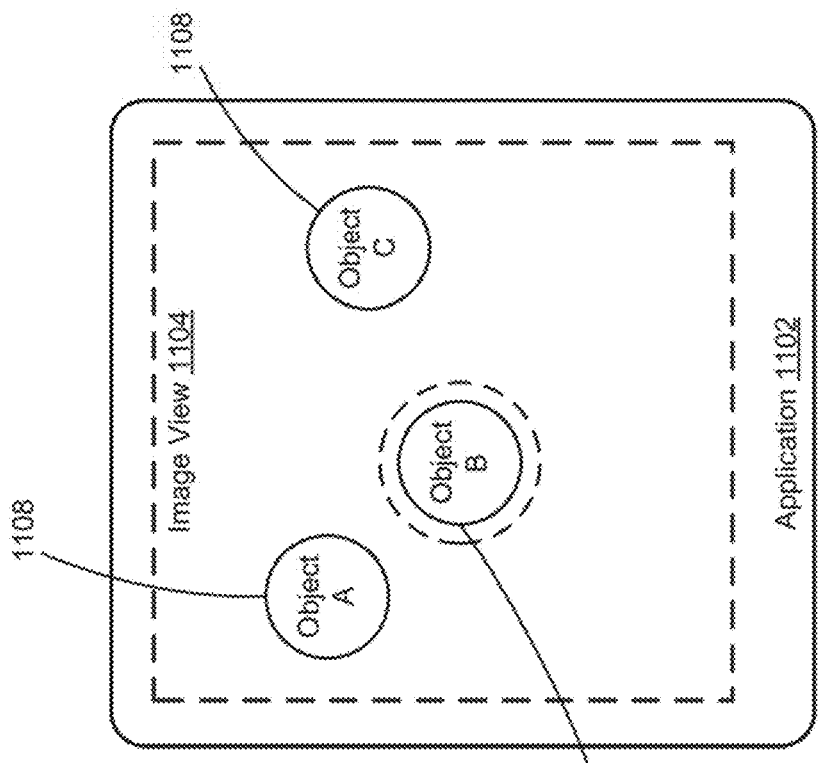
FIG. 11 illustrates using object recognition to identify representations of objects in a movable object environment, in accordance with various embodiments of the present disclosure.
Figure 11:
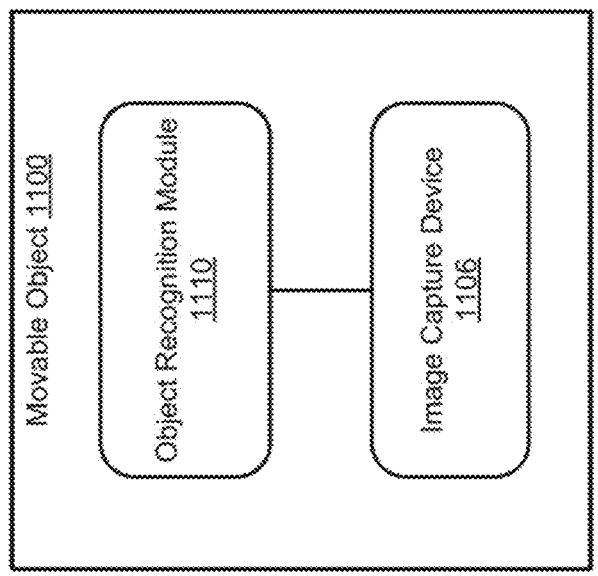

FIG. 11 illustrates using object recognition to identify representations of objects in a movable object environment, in accordance with various embodiments of the present disclosure. As shown in FIG. 11, a movable object 1100 can communicate with an application 1102. As discussed, application 1102 can execute on a control terminal, including a client device such as a desktop computer, laptop computer, tablet, smartphone, wearable computer, or other mobile device. Application 1102 can include an image view 1104 which displays image data received from image capture device 1106. The image data can include various objects 1108 within view of the image capture device 1106 in a movable object environment.

In various embodiments, movable object 1100 can include an object recognition module 1110. Using the object recognition module, at least one object depicted in the image data associated with the at least one feature point can be identified. For example, object B may be a feature model corresponding to the at least one object can then be obtained. The feature model can represent image characteristics of the at least one object. In some embodiments, each object may be recognized automatically, for example, by comparing each object 1108 in the image view 1104 to a library of feature models accessible to object recognition module 1110. In some embodiments, objects may be recognized upon selection, for example as part of a gesture-based input. For example, as shown in FIG. 11, Object B has been selected. Object B may then be compared to available feature models to recognize the object. As discussed, a similarity score may be calculated for each object-feature model pair, based on object recognition and computer vision techniques. Matches may be determined where the similarity score is greater than a threshold score. In some embodiments, object data, such as height, elevation, and geographic coordinates may also be retrieved for the identified object.

The coordinates of recognized objects may be monitored as additional image data is received from image capture device 1106. In some embodiments, subsequent image data can be received from the image capture device. One or more features can be extracted from the subsequent image data, and matched to the feature model. A third reference coordinate corresponding to a location of the at least one object in the subsequent image data can then be determined. In some embodiments, a position of the movable object relative to the at least one object can be determined based on the object data associated with the at least one object.

Figure 12:
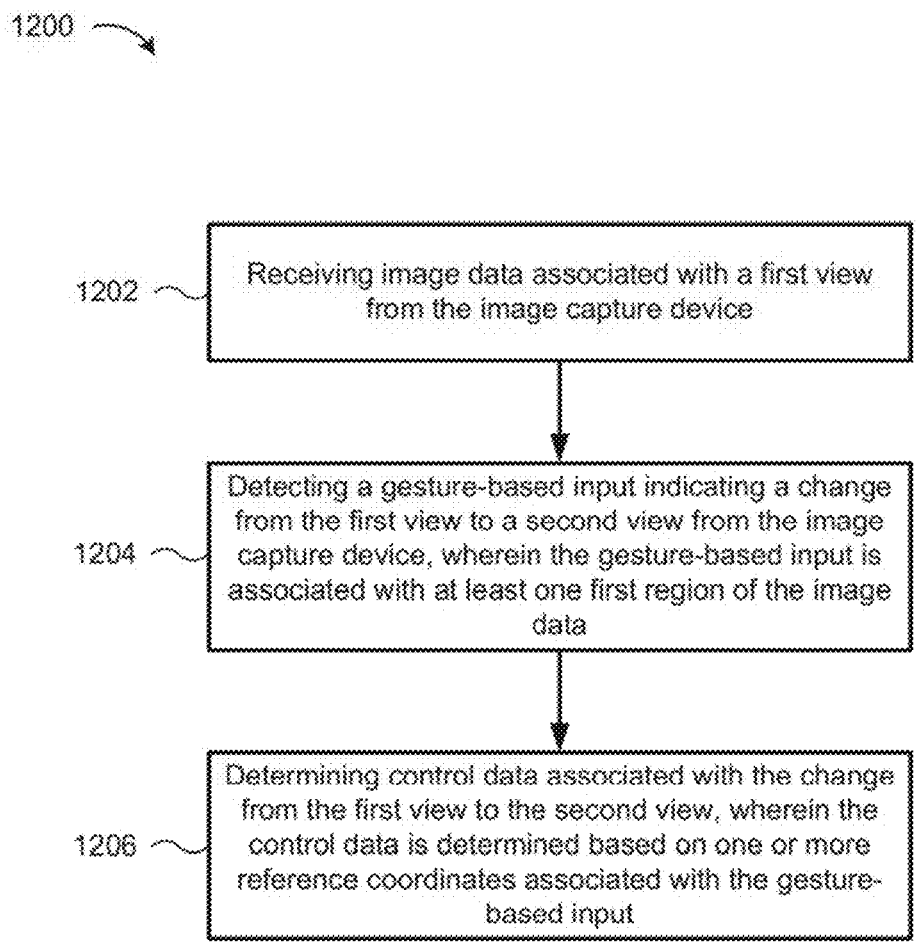
FIG. 12 shows a flowchart of navigating a movable object using gesture-based controls in a movable object environment, in accordance with various embodiments of the present disclosure.

FIG. 12 shows a flowchart 1200 of navigating a movable object using gesture-based controls in a movable object environment, in accordance with various embodiments of the present disclosure. At step 1202, image data associated with a first view can be received from the image capture device.

At step 1204, a gesture-based input indicating a change from the first view to a second view from the image capture device can be detected. The gesture-based input can be associated with at least one first region of the image data. In some embodiments, the gesture-based input can be analyzed to identify at least one feature point in the image data associated with the at least one first region of the image data. The gesture-based input can include a first point that corresponds to the at least one first region of the image data. A first reference coordinate can be calculated corresponding to the first point that represents the at least one first region.

In some embodiments, a second reference coordinate corresponding to a second point of the gesture-based input can be determined, and a control vector representing a difference between the first reference coordinate and the second reference coordinate can then be determined. The control vector can represent the difference or error between the two coordinates. The control data, including a control signal based on the control vector, can then be sent to the movable object. In some embodiments, subsequent image data can be received from the image capture device, and the at least one feature point can be identified in the subsequent image data. A third reference coordinate corresponding to a location of the at least one feature point in the subsequent image data can then be determined. As discussed, the control loop can continue to process and a subsequent control vector representing a difference between the third reference coordinate and the second reference coordinate can be determined. A subsequent control signal can be determined based on the subsequent control vector and sent to the movable object.

At step 1206, control data associated with the change from the first view to the second view can be determined. The control data can be determined based on one or more reference coordinates associated with the gesture-based input. In some embodiments, the control data can be sent to a communication module associated with, e.g., a movable object, server, client device, or other computing device.

In some embodiments, it can be determined that the gesture-based input is associated with at least one second region of image data. For example, a multi-touch gesture may be associated with a plurality of regions of image data, corresponding to each initial touch point that is detected. A first reference coordinate corresponding to the at least one first region and a second reference coordinate corresponding to the at least one second region can be calculated. A control vector based on a difference between the first reference coordinate and the second reference coordinate can then be calculated. Calculating the control vector can include determining a first value corresponding to a distance between the first reference coordinate and the second reference coordinate and determining a second value corresponding to a distance between the at least one first region and the at least one second region. The control vector can then be determined based on a difference between the first value and the second value.

As discussed, in some embodiments the control data can include navigation commands for controlling navigational parameters of the movable object, the navigation parameters calculated using the at least one first region of the image data and the one or more reference coordinates. In various embodiments, the gesture-based input includes one or more of one or more taps, a swipe gesture, a pinch-and-zoom gesture, an eye gesture, or an audio command. In various embodiments, the one or more reference coordinates associated with the gesture-based input correspond to a reference display on which the image data is displayed, wherein the reference display includes one or more of a head-mounted display, a touchscreen display, or a projected display.

Figure 13:
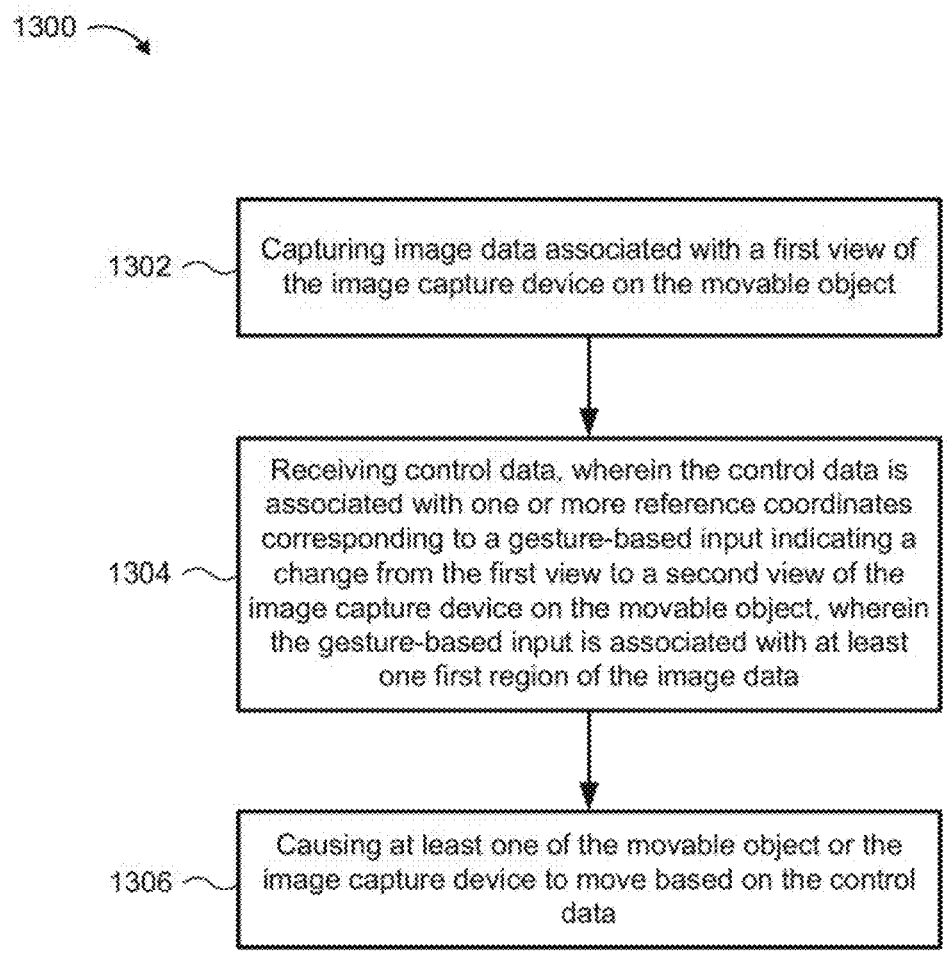
FIG. 13 shows a flowchart of receiving navigation commands based on gesture-based controls in a movable object environment, in accordance with various embodiments of the present disclosure.

FIG. 13 shows a flowchart 1300 of receiving navigation commands based on gesture-based controls in a movable object environment, in accordance with various embodiments of the present disclosure. At step 1302, image data associated with a first view of the image capture device on the movable object can be captured.

At step 1304, control data can be received. The control data can be associated with one or more reference coordinates corresponding to a gesture-based input indicating a change from the first view to a second view of the image capture device on the movable object. The gesture-based input can be associated with at least one first region of the image data.

In some embodiments, a first reference coordinate corresponding to the at least one first region can be received. The first reference coordinate can represent a first point that is associated with the at least one first region of the image data. A second reference coordinate corresponding to a second point of the gesture-based input can also be received. A control signal based on a control vector representing a difference between the first reference coordinate and the second reference coordinate can be obtained. For example, as discussed, the control signal can be determined by a controller on the movable object, by an application, or by any other computing device communicatively coupled to the movable object and the application.

At step 1306, at least one of the movable object or the image capture device can be caused to move based on the control data. In some embodiments, first control data, based on the control signal, can be determined. The first control data can correspond to a movement of the image capture device associated with the change from the first view to the second view. Second control data, based on the control signal and the first control data, can also be determined. The second control data can correspond to at least one of a positional or an attitudinal change of the movable object associated with the change from the first view to the second view. Navigation instructions can then be determined based on the second control data. In some embodiments, the image capture device can be caused to be rotated using the first control data. The navigation instructions can be executed to cause the movable object to change at least one of position or attitude.

In some embodiments, subsequent image data can be captured and subsequent control data can be received. The subsequent control data including at least a third reference coordinate corresponding to a location of one or more features associated with the at least one first region in the subsequent image data. A subsequent control signal, based on a subsequent control vector representing a difference between the third reference coordinate and the second reference coordinate, can then be obtained. In some embodiments, based on the subsequent control signal, a first subsequent control data corresponding to a movement of the image capture device associated with the change from the first view to the second view. A second subsequent control data, based on the subsequent control signal and the first subsequent control data, corresponding to at least one of a positional or an attitudinal change of the movable object associated with the change from the first view to the second view. Subsequent navigation instructions can then be determined based on the second subsequent control data.

In some embodiments, the image capture device can be caused to be further rotated using the first subsequent control data. Similarly, the one or more subsequent navigation instructions can be executed to cause the movable object to further change at least one of position or attitude.

In some embodiments, it can be determined that the control data is associated with at least one second region of image data, and a first reference coordinate corresponding to the at least one first region, and a second reference coordinate corresponding to the at least one second region can be obtained. A control vector can then be calculated based on a difference between the first reference coordinate and the second reference coordinate. In some embodiments, the control vector can be calculated by determining a first value corresponding to a distance between the first reference coordinate and the second reference coordinate, and a second value corresponding to a distance between the at least one first region and the at least one second region. The control vector can then be determined based on a difference between the first value and the second value. Using the control vector first control data corresponding to a positional change of the movable object associated with the change from the first view to the second view can be determined. One or more navigation instructions may then be determined based on the first control data. The one or more navigation instructions can be executed to cause the movable object to change position based on the control vector.

Many features of the present disclosure can be performed in, using, or with the assistance of hardware, software, firmware, or combinations thereof. Consequently, features of the present disclosure may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A system for controlling an unmanned aerial vehicle (UAV) comprising:
   a processor; and
   a storage medium storing instructions that, when executed by the processor, cause the processor to:
   receive image data from a camera coupled to the UAV, the image data being associated with a first view of the camera;
   send the image data in real time to a client device;
   receive control data from the client device, the control data comprising a control vector determined based on a gesture-based input corresponding to a first reference coordinate and a second reference coordinate, the gesture-based input indicating a change from the first view to a second view of the camera, the first reference coordinate being associated with at least one region in the first view of the image data, and the control vector indicating a distance between the at least one region and the second reference coordinate; and
   adjust at least one of a position or an attitude of the UAV or the camera based on the control data.

2. The system of claim 1, wherein the instructions further cause the processor to:
   determine first control data corresponding to a movement of the camera associated with the change from the first view to the second view;
   determine second control data corresponding to at least one of a positional change or an attitudinal change of the UAV associated with the change from the first view to the second view;
   determine one or more navigation instructions based on the second control data;
   cause the camera to be rotated using the first control data; and
   execute the one or more navigation instructions to cause the UAV to change at least one of the position or the attitude.

3. The system of claim 1, wherein the instructions further cause the processor to:
   cause the camera to capture subsequent image data; and
   receive subsequent control data, the subsequent control data including at least a third reference coordinate corresponding to a location of at least one feature associated with the at least one region in the subsequent image data.

4. The system of claim 3, wherein the instructions further cause the processor to:
   determine a subsequent control vector representing a difference between the third reference coordinate and the second reference coordinate.

5. The system of claim 1, wherein the control vector indicates a direction from the first reference coordinate toward the second reference coordinate, and the instructions further cause the processor to:
   adjust at least one of the position or the attitude of the UAV or the camera to change the camera from the first view to the second view along the direction.

6. The system of claim 1, wherein the instructions further cause the processor to:
   adjust at least one of the position or the attitude of the UAV or the camera based on the control data until the at least one region overlays with the second reference coordinate.

7. A method for controlling a movable object with an image capture device comprising:
   capturing image data associated with a first view of the image capture device;
   receiving control data, the control data comprising a control vector determined based on a gesture-based input corresponding to a first reference coordinate and a second reference coordinate, the gesture-based input indicating a change from the first view to a second view of the camera, the first reference coordinate being associated with at least one region in the first view of the image data, and the control vector indicating a distance between the at least one region and the second reference coordinate; and controlling at least one of position or an attitude of the movable object or the image capture device to move based on the control data.

8. The method of claim 7, further comprising:

determining, based on the control signal, first control data corresponding to a movement of the image capture device associated with the change from the first view to the second view;

determining, based on the control signal and the first control data, second control data corresponding to at least one of a positional change or an attitudinal change of the movable object associated with the change from the first view to the second view; and determining one or more navigation instructions based on the second control data.

9. The method of claim 8, further comprising:

causing the image capture device to be rotated using the first control data; and executing the one or more navigation instructions to cause the movable object to change at least one of the position or the attitude.

10. The method of claim 7, further comprising:

capturing subsequent image data; and receiving subsequent control data, the subsequent control data including at least a third reference coordinate corresponding to a location of one or more features associated with the at least one region in the subsequent image data; and obtaining a subsequent control signal based on a subsequent control vector representing a difference between the third reference coordinate and the second reference coordinate.

11. The method of claim 10, further comprising:

determining, based on the subsequent control signal, first subsequent control data corresponding to a movement of the image capture device associated with the change from the first view to the second view;

determining, based on the subsequent control signal and the first subsequent control data, second subsequent control data corresponding to at least one of a positional change or an attitudinal change of the movable object associated with the change from the first view to the second view; and determining one or more subsequent navigation instructions based on the second subsequent control data.

12. The method of claim 11, further comprising:

causing the image capture device to be further rotated using the first subsequent control data; and executing the one or more navigation instructions to cause the movable object to further change at least one of the position or the attitude.

13. The method of claim 7, wherein:

the at least one region of the image data is at least one first region of the image data; and receiving the control data comprises:

determining the control data is associated with at least one second region of the image data;

obtaining the first reference coordinate corresponding to the at least one first region;

obtaining the second reference coordinate corresponding to the at least one second region; and calculating the control vector based on a difference between the first reference coordinate and the second reference coordinate.

14. The method of claim 13, wherein calculating the control vector comprises:

determining a first value corresponding to a distance between the first reference coordinate and the second reference coordinate;

determining a second value corresponding to a distance between the at least one first region and the at least one second region; and determining the control vector based on a difference between the first value and the second value.

15. The method of claim 14, further comprising:

determining, based on the control vector, first control data corresponding to a positional change of the movable object associated with the change from the first view to the second view;

determining one or more navigation instructions based on the first control data; and executing the one or more navigation instructions to cause the movable object to change position based on the control vector.

16. The method of claim 7, wherein the first reference coordinate and the second reference coordinate correspond to locations on a reference display including at least one of a head-mounted display, a touchscreen display, or a projected display.

17. The method of claim 7, wherein the control vector indicates a direction from the first reference coordinate toward the second reference coordinate, and controlling at least one of the position or the attitude comprises:

adjusting at least one of the position or the attitude of the movable object or the image capture device to change the image capture device from the first view to the second view along the direction.

18. The method of claim 7, wherein controlling at least one of the position or the attitude comprises:

adjusting at least one of the position or the attitude of the movable object or the image capture device based on the control data until the at least one region overlays with the second reference coordinate.

19. A system for controlling a movable object comprising:

an image capture device coupled to the movable object and configured to capture image data associated with a first view of the image capture device; and a non-transitory computer-readable medium including instructions stored thereon which, when executed by a processor, cause the processor to:

receive control data, the control data comprising a control vector determined based on a gesture-based input corresponding to a first reference coordinate and a second reference coordinate, the gesture-based input indicating a change from the first view to a second view of the image capture device, the first reference coordinate being associated with at least one region in the first view of the image data, and the control vector indicating a distance between the at least one region and the second reference coordinate; and controlling at least one of position or an attitude of the movable object or the image capture device to move based on the control data.

20. The system of claim 19, wherein the instructions further cause the processor to:

receive the first reference coordinate corresponding to the at least one region, the first reference coordinate representing a first point that is associated with the at least one region of the image data;

receive the second reference coordinate corresponding to a second point of the gesture-based input; and obtain a control signal based on the control vector representing a difference between the first reference coordinate and the second reference coordinate.

21. The system of claim 20, wherein the instructions further cause the processor to:

determine, based on the control signal, first control data corresponding to a movement of the image capture device associated with the change from the first view to the second view;

determine, based on the control signal and the first control data, second control data corresponding to at least one of a positional change or an attitudinal change of the movable object associated with the change from the first view to the second view; and determine one or more navigation instructions based on the second control data.

22. The system of claim 21, wherein the instructions further cause the processor to:

cause the image capture device to be rotated using the first control data; and execute the one or more navigation instructions to cause the movable object to change at least one of the position or the attitude.

23. The system of claim 19, wherein the control vector indicates a direction from the first reference coordinate toward the second reference coordinate, and the instructions further cause the processor to:

adjust at least one of the position or the attitude of the movable object or the image capture device to change the image capture device from the first view to the second view along the direction.

24. The system of claim 19, wherein the instructions further cause the processor to:

adjust at least one of the position or the attitude of the movable object or the image capture device based on the control data until the at least one region overlays with the second reference coordinate.

* * * * *